United States Patent
Wilson et al.

(10) Patent No.: US 10,539,199 B2
(45) Date of Patent: Jan. 21, 2020

(54) MULTI-PISTON CALIPER

(71) Applicant: AKEBONO BRAKE INDUSTRY CO., LTD., Chuo-ku, Tokyo (JP)

(72) Inventors: Kirby Lee Wilson, Lathrup Village, MI (US); Andreas Keller, Dexter, MI (US); Adrian Smith, Ann Arbor, MI (US)

(73) Assignee: AKEBONO BRAKE INDUSTRY CO., LTD, Chuo-ku, Tokyo (JP)

( * ) Notice: Subject to any disclaimer, the term of this patent is extended or adjusted under 35 U.S.C. 154(b) by 0 days.

(21) Appl. No.: 15/864,099

(22) Filed: Jan. 8, 2018

(65) Prior Publication Data

US 2018/0209495 A1   Jul. 26, 2018

Related U.S. Application Data

(60) Provisional application No. 62/448,596, filed on Jan. 20, 2017.

(51) Int. Cl.
*F16D 55/00* (2006.01)
*F16D 65/00* (2006.01)
(Continued)

(52) U.S. Cl.
CPC ....... *F16D 65/0068* (2013.01); *F16D 55/228* (2013.01); *F16D 65/183* (2013.01);
(Continued)

(58) Field of Classification Search
CPC .. F16D 55/228; F16D 65/0068; F16D 65/183; F16D 2055/0016;
(Continued)

(56) References Cited

U.S. PATENT DOCUMENTS 5,620,063 A * 4/1997 Smith ............... F16D 55/228
 188/240
8,733,515 B2 * 5/2014 Hiramori ............ F16D 55/227
 188/106 P
(Continued)

FOREIGN PATENT DOCUMENTS

DE 4301684 A1 8/1994
DE 10212670 12/2002
(Continued)

OTHER PUBLICATIONS

Akebono, Concept Automotive Brakes, http://www.akebono-brake.com/english/product_technology/product/concept_products/automotive/index.html.

*Primary Examiner* — Thomas W Irvin
(74) *Attorney, Agent, or Firm* — The Dobrusin Law Firm, P.C.

(57) ABSTRACT

A caliper comprising: (a) an inboard side; (b) an outward side, wherein the inboard side and the outboard side include three or more bores that are radially staggered relative to two or more of the bores; and (c) a pocket located within a central region of the inboard side, the outboard side, or both; wherein the bores on the inboard side, the outboard side, or both are positioned so that: (i) all of the bores are located entirely radially below the pocket; (ii) none of the bores are located below the pocket; (iii) one or more of the bores are located partially radially below the pocket; (iv) one or more of the bores are located entirely radially below the pocket; (v) one or more of the bores are not located partially or entirely radially below the pocket; or (vi) a combination of (iii) through (v).

17 Claims, 19 Drawing Sheets

(51) Int. Cl.
*F16D 55/228* (2006.01)
*F16D 65/18* (2006.01)
*F16D 121/04* (2012.01)
*F16D 125/10* (2012.01)

(52) U.S. Cl.
CPC ............... *F16D 2055/0016* (2013.01); *F16D 2055/0066* (2013.01); *F16D 2055/0091* (2013.01); *F16D 2121/04* (2013.01); *F16D 2125/10* (2013.01)

(58) Field of Classification Search
CPC ..... F16D 2055/0066; F16D 2055/0091; F16D 2121/04; F16D 2125/10
See application file for complete search history.

(56) References Cited

U.S. PATENT DOCUMENTS

| | | | |
|---|---|---|---|
| 9,212,713 | B2 | 12/2015 | Preda et al. |
| 9,746,042 | B2 * | 8/2017 | Morio ..................... F16D 65/18 |
| 2003/0089559 | A1 | 5/2003 | Stahl et al. |
| 2006/0124404 | A1 | 6/2006 | Morais et al. |
| 2006/0219490 | A1 | 10/2006 | Eisengraber et al. |
| 2007/0170020 | A1 | 7/2007 | Halasy-Wimmer et al. |
| 2009/0071767 | A1 | 3/2009 | Bass et al. |
| 2009/0236187 | A1 | 9/2009 | Bach et al. |
| 2013/0277158 | A1 | 10/2013 | Previtali et al. |
| 2014/0158483 | A1 * | 6/2014 | Miyahara ............... F16D 55/228 188/73.47 |
| 2015/0027822 | A1 | 1/2015 | Cerutti et al. |
| 2018/0119762 | A1 * | 5/2018 | Smith ................. F16D 65/0068 |
| 2018/0328431 | A1 * | 11/2018 | Crippa ................. F16D 55/228 |

FOREIGN PATENT DOCUMENTS

| | | | |
|---|---|---|---|
| DE | 102006052177 A1 | 5/2008 | |
| DE | 102008029582 A1 | 4/2009 | |
| DE | 102011052169 A1 | 1/2013 | |
| EP | 0710777 A2 | 6/1996 | |
| EP | 1865218 A1 | 12/2007 | |
| EP | 1898116 A1 | 3/2008 | |
| EP | 1911989 A1 | 4/2008 | |
| FR | 2126588 A5 | 10/1972 | |
| GB | 2187807 A | 9/1987 | |
| GB | 2473001 A | 3/2011 | |
| JP | H09257063 A | 9/1997 | |
| JP | 2007-147041 | 6/2007 | |
| JP | 2009-257578 | 11/2009 | |
| WO | WO-0131224 A1 * | 5/2001 | ........... F16D 55/228 |
| WO | 2006/035464 A1 | 4/2006 | |
| WO | 2006/109710 A1 | 10/2006 | |
| WO | WO-2006109710 A1 * | 10/2006 | ........... F16D 55/228 |
| WO | 2008/075386 A1 | 6/2008 | |
| WO | 2011/121553 | 10/2011 | |
| WO | 2018/127751 A1 | 7/2018 | |

\* cited by examiner

MULTI-PISTON CALIPER

FIELD

The present teachings generally relate to a caliper that includes multiple pistons and preferably a fixed opposed caliper that includes multiple pistons on each side of a rotor, and more particularly the multiple pistons are configured to have a plurality of tracks and to be radially offset as well as circumferentially offset relative to each other.

BACKGROUND

Brake systems are used to slow or stop a moving device. Typically, most brake systems are used to slow or stop a vehicle. Some brake systems include a sliding caliper that includes pistons on one side that move a brake pad into contact with a rotor and then an opposing side of the caliper slides to move an opposing brake pad into contact with an opposing side of the rotor. Other brake systems are a fixed brake system (opposed brake system) with opposing pistons that simultaneously move brake pads into contact with opposing sides of a rotor, without the caliper moving. These fixed brake systems provide good stopping power and performance, however, there are attempts to reduce weight of these systems while maintaining stopping power and performance. Typically, fixed brake systems have two or more pistons on each side of a rotor and the pistons are in a line that follows the curvature of the rotor. More recently, attempts have been made to stagger the pistons within the respective sides of the caliper.

Examples of some brake assemblies may be found in U.S. Pat. No. 9,212,713; German Patent Application Nos. DE4301684A1, DE10212670, and DE102011052169A1; Japanese Patent Application Publication Nos. JP2007-147041 and JP2009-257578; and International Patent Application Publication No.: WO2011/121553 all of which are incorporated by reference herein for all purposes. It would be attractive to have a brake having an inboard side and an outboard side, each side having bores and pistons that are radially staggered and one or more of the bores on the inboard side, the outboard side, or both are partially radially covered, entirely radially covered, or both by one or more pockets. What is needed is a brake having an inboard side and an outboard side, each side having bores that are radially staggered and asymmetrically located on a trailing side and leading side of a bisecting plane (or line). What is needed is a brake having an inboard side and an outboard side, each side having bores that are surrounded by a boot groove, the boot grooves being partially radially covered, entirely radially covered, or both by one or more pockets. It would be attractive to have a brake having an inboard side and an outboard side, each side having bores that are radially staggered such that a center of each bore forms a circumferential track on a rotor so that three or more tracks are formed that are each a circumferential non-overlapping ring. What is needed is a brake having an inboard side and an outboard side, each side having two or more bores that are radially staggered and partially or entirely stacked with one bore located partially or entirely radially above another bore and the bore located above having a larger diameter larger than the bore located below. It would be attractive to have a clip mount located within a window of the caliper that assists in mounting one or more clips to a bridge of the caliper.

SUMMARY

The present teachings meet one or more of the present needs by providing: a caliper comprising: (a) an inboard side including three or more bores, wherein one or more of the bores is radially staggered relative to two or more of the three or more bores; (b) an outward side including three or more bores, wherein one or more of the bores is radially staggered relative to two or more of the three or more bores; and (c) a pocket located within a central region of the inboard side, the outboard side, or both; wherein the three or more bores on the inboard side, the outboard side, or both are positioned so that: (i) all of the three or more bores are located entirely radially below the pocket; (ii) none of the three or more bores are located entirely or partially radially below the pocket; (iii) one or more of the three or more bores are located partially radially below the pocket; (iv) one or more of the three or more bores are located entirely radially below the pocket; (v) one or more of the three or more bores are not located partially or entirely radially below the pocket; or (vi) a combination of (iii) through (v).

The present teachings meet one or more of the present needs by providing: a caliper comprising: (a) an inboard side including three or more bores, wherein one or more of the bores is radially staggered relative to two or more of the three or more bores; (b) an outward side including three or more bores, wherein one or more of the bores is radially staggered relative to two or more of the three or more bores; and (c) a bisecting plane that bisects the inboard side and the outboard side forming a leading region on a first side of the bisecting plane and a trailing region on a second side of the bisecting plane; wherein the three or more bores on the inboard side and the outboard side are asymmetrically located on the inboard side and the outboard side relative to the bisecting plane.

The present teachings provide: a caliper comprising: (a) an inboard side including three or more bores, wherein one or more of the bores is radially staggered relative to two or more of the three or more bores; (b) an outward side including three or more bores, wherein one or more of the bores is radially staggered relative to two or more of the three or more bores; and (c) a pocket located within a central region of the inboard side, the outboard side, or both; (d) a boot groove that extends around each of the bores; wherein each of the boot grooves are substantially concentric with the bores and have a diameter that is greater than a diameter of the bores, and wherein each of the boot grooves and the three or more bores on the inboard side, the outboard side, or both are positioned so that: (i) all of the three or more bores and boot grooves are located entirely radially below the pocket; (ii) none of the three or more bores and boot grooves are located entirely or partially radially below the pocket; (iii) one or more of the boot grooves is located partially radially below the pocket; (iv) one or more of the boot grooves and the bores are located partially radially below the pocket; (v) one or more of the bores is located entirely radially below the pocket and the boot groove associated with the bore is located partially radially below the pocket; or (vi) one or more of the boot grooves and associated bores is located entirely radially below the pocket.

The present teachings provide: a caliper comprising: (a) an inboard side including three or more bores, wherein one or more of the bores is radially staggered relative to two or more of the three or more bores; and (b) an outward side including three or more bores, wherein one or more of the bores is radially staggered relative to two or more of the three or more bores; and wherein the radial stagger of the three or more bores on the inboard side and the outboard side are sufficient so that as a rotor passes between the inboard side and the outboard side a center of each of the bores aligns with the rotor forming a circumferential track on the rotor and the rotor include three or more circumferential non-overlapping tracks on an inboard face and three or more circumferential non-overlapping tracks on an outboard face.

The present teachings provide: a caliper comprising: (a) an inboard side including three or more bores, wherein one or more of the bores is radially staggered relative to two or more of the three or more bores; and (b) an outward side including three or more bores, wherein one or more of the bores is radially staggered relative to two or more of the three or more bores; and wherein the inboard side and the outboard side include: (i) a top; (ii) a bottom, (iii) a trailing side connecting the top to the bottom, and (iv) a leading side connecting the top to the bottom; wherein one or more bores are located proximate to the top and one or more bores are located proximate to the bottom, and the one or more bores located proximate to the top have a larger diameter than the one or more bores located proximate to the bottom.

The present teachings provide: a caliper comprising: (a) an inboard side including three or more bores, wherein one or more of the bores is radially staggered relative to two or more of the three or more bores; (b) an outward side including three or more bores, wherein one or more of the bores is radially staggered relative to two or more of the three or more bores; (c) one or more bridges extending between the inboard side and the outboard side; (d) one or more windows located proximate to the one or more bridges; and (e) one or more clip mounts connected to one or more of the one or more bridges.

The present teachings provide a brake having an inboard side and an outboard side, each side having bores and pistons that are radially staggered and one or more of the bores on the inboard side, the outboard side, or both are partially radially covered, entirely radially covered, or both by one or more pockets. The present teachings provide an inboard side and an outboard side, each side having bores that are radially staggered and asymmetrically located on a trailing side and leading side of a bisecting plane (or line). The present teachings provide a brake having an inboard side and an outboard side, each side having bores that are surrounded by a boot groove, the boot grooves being partially radially covered, entirely radially covered, or both by one or more pockets. The present teachings provide a brake having an inboard side and an outboard side, each side having bores that are radially staggered such that a center of each bore forms a circumferential track on a rotor so that three or more tracks are formed that are each a circumferential non-overlapping ring. The present teachings provide an inboard side and an outboard side, each side having two or more bores that are radially staggered and partially or entirely stacked with one bore located partially or entirely radially above another bore and the bore located above having a larger diameter larger than the bore located below. The present teachings provide a clip mount located within a window of the caliper that assists in mounting one or more clips to a bridge of the caliper.

DETAILED DESCRIPTION

Figure 1:
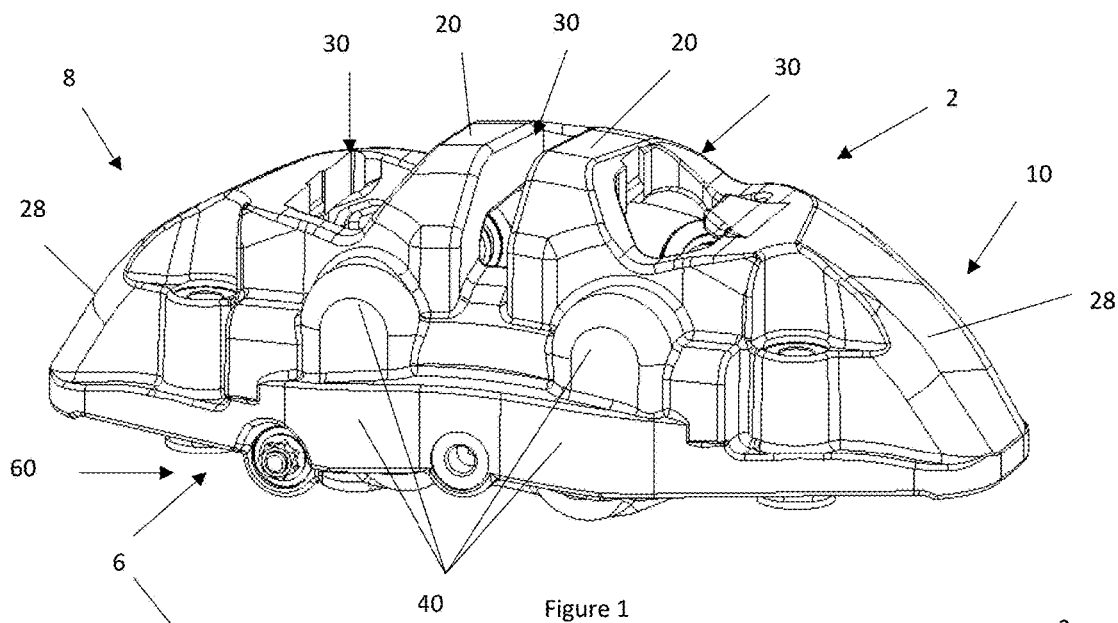
FIG. 1 is a perspective view of an inboard side of a caliper.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake assembly. The brake assembly functions to create a braking force to stop an object such as a vehicle. However, the brake assembly may be used with a car, truck, bus, train, airplane, motorcycle, lathe, winder for paper products or cloth, amusement park rides, turbines, wind turbines, or a combination thereof. The brake assembly, preferably, is used with a vehicle, and more preferably with a passenger vehicle. The brake assembly may include a rotor, caliper, two or more brake pads, support bracket, be free of a support bracket, or a combination thereof.

The caliper functions to create a braking force that slows and/or stops an object such as a vehicle. The caliper includes a top and a bottom and the top is located radially above the bottom. The caliper may be mounted to a stationary object and the caliper may move relative to the stationary object. For example, during a braking event the caliper may slide relative to a knuckle of a vehicle to create the braking force so that both sides of a rotor are contacted by opposing brake pads. Preferably, the caliper may be mounted to a stationary object and the caliper may remain static relative to the stationary object. For example, during a braking event opposing pistons may move within the caliper but the caliper remains static relative to the stationary object or knuckle. More preferably, the caliper is a fixed opposed caliper (e.g., OPZ) with bores and pistons on both an inboard side and an outboard side that move towards each other to create a braking force during a braking event.

The outboard side may be a side of the caliper that faces out from under a vehicle (e.g., faces a rim of a tire). The inboard side may face under the vehicle. The inboard side and the outboard side are opposing sides of the caliper. The inboard side and outboard side may each having a leading side (or end) and a trailing side (or end). The leading side may be the side of the caliper that the rotor passes by first and the trailing side may be the side that the rotor exits (or passes by second). The rotor may pass between the inboard side and the outboard side. The leading side, the trailing side, or both sides may connect the caliper to a vehicle and preferably to a knuckle. Preferably, the inboard side connects the caliper to the knuckle via one or more fastener bores.

The one or more fastener bores function to fixedly connect the caliper within a system. Preferably, the one or more fastener bores connect the caliper to a knuckle. The one or more fastener bores may be a through hole that receives a fastener for forming a fixed connection to a knuckle. The one or more fastener bores may extend parallel to a rotor, perpendicular to a rotor, or an angle therebetween. The caliper may include two or more fastener bores and at least one fastener bore is located proximate to the leading side and at least one fastener bore is located proximate to the trailing side. The one or more fastener bores may extends through a bridge, proximate to a bridge, through an outer bridge, proximate to an outer bridge, or a combination thereof.

The caliper may include one or more bridges. The bridges may function to connect an inboard side to an outboard side. The one or more bridges may be located in a central portion of the caliper. The one or more bridges may be located in the trailing region, the leading region, or both (e.g., an end bridge). The caliper may include one or more bridges. Preferably, the caliper includes a plurality of bridges (e.g., 2, 3, 4, 5, or even 6 bridges). The bridges extend between the leading side and the trailing side over the rotor. The bridges extend between the leading side and the trailing side so that during a brake apply a plane extending through the leading side and a plane extending through the trailing side remain substantially parallel. The bridges may extend straight across between the trailing side and the leading side (e.g., at a 90 degree angle). The bridges may extend at an angle from one side to the other side. The bridges may extend at an angle of about 25 degrees or more, about 45 degrees or more or even about 60 degrees or more relative to the leading side, the trailing side, or both. The bridges may extend at an angle of about 90 degrees or less or about 75 degrees or less. When more than one bridges are present the bridges may have at least a portion that diverted from another bridge. The bridges may be parallel. The bridges may have a portion that converges. The bridges may extend from an inboard side or an outboard side to a leading side or a trailing side. A bridge may extend from an inboard side or an outboard side to another bridge. For example, if a first bridge extends from an inboard side to a leading side, then a second bridge may extend from the outboard side into contact with the first bridge to connect the inboard side to the outboard side. Each of the bridges may be discrete along their lengths. The bridges may include a curved portion. The bridges may have connection points that are in a straight line, but the bridges may curve between the connection points. The bridges may vary in width, thickness, or both as they extend between the inboard side and the outboard side. The bridges may flare and become wider at a location proximate to the leading side, the trailing side, or both. The bridges maybe widest, thickest, or both at connection points. The bridges may be separated by one or more windows. The bridges may be connected together along their length. The bridges may be connected by a connector bridge.

The connector bridge may function to connect the bridges together at a location between the leading side and the trailing side. The connector bridge may prevent the bridges from moving in the leading direction, the trailing direction, or both directions. The connector bridge may create stiffness in the caliper proximate to the plurality of piston bores. The connector bridge may be located on the leading side, the trailing side, or both sides. The caliper may be free of a connector bridge. The connector bridge and bridges may create a "U" shape, an "X" shape, an "H" shape, or a combination thereof. The connector bridge may be a piece of material that extends between two bridges and closes a window between the bridges. The connector bridge may be located proximate to the inboard side. Preferably, the connector bridge is located proximate to the outboard side. The connector bridge may create, extend around, extend partially around, or a combination thereof one or more pockets.

The one or more pockets function to dissipate heat, allow for air movement, remove mass, permit for a redistribution of mass, or a combination thereof. The one or more pockets may be located proximate to the bores, pistons, or both. The one or more pockets may be an absence of material, a reduction of material, or both. The one or more pockets may promote air movement in predetermined regions. For example, the pockets may promote air to move between the bores, the pistons, or both. The pockets may remove material from regions of low stress. The pockets may create turbulence in regions typically having laminar air flow. When two or more pistons are present the pockets may be located between one or more of bores, partially radially over one or more of the bores, entirely radially over one or more of the bores, on a radial track of one or more bores, on a circumferential track of one of the one or more bores, or a combination thereof. When a plurality of pockets are present at least one pocket is centrally located (i.e., a central pocket). The central pocket may be located between one or more other pockets, may be located on or proximate to the bisecting line, or both. The central pocket may be the pocket located closest to the bisecting plane, between the plurality of bores, or both. The one or more pockets may be located along a rotor effective radius. The one or more pockets may be located in a same plane (e.g., a vertical plane within a leading side or a trailing side) as one or more of the bores. For example, the caliper has a top and a bottom and if one of the bores is located about half way between the top and the bottom the pocket may be located about half way between the top and bottom such that some portion of the pocket and the bore are located within the same plane. The one or more pockets may be located in line with one or more bores in a circumferential direction. For example, as the rotor rotates a point on the rotor passes by a bore and then passes by a pocket. The one or more pockets may be symmetrically located between the bores. The one or more pockets may be asymmetrically located between the bores. For example, the pocket may be offset to the leading side or the trialing side. The one or more pockets may be located in a central region of the caliper. The one or more pockets may have a portion that is within the central region and a portion that is offset towards the leading side or the trailing side. The one or more pockets discussed herein are preferably located in a central region. The one or more pockets may be located on the bisecting plane or bisecting line. The one or more pockets may not be radially located above any bores.

The one or more pockets may be partially radially located above one or more bores, two or more bores, three or more bores, four or more bores, five or more bores, or even six or more bores. The one or more pockets may be entirely radially located above zero bores, one or more bores, two or more bores, three or more bores, four or more bores, five or more bores, or even six or more bores. The one or more pockets may be partially radially located over one or more bores and entirely radially located over one or more bores. The one or more pockets may be partially radially located over two or more bores and entirely radially located over one or more bores. The one or more pockets may be partially radially located over one or more bores and entirely radially located over two or more bores. The one or more pockets may be partially radially located over two or more bores and entirely radially located over two or more bores. The one or more pockets may be located partially radially over one or more boot grooves, two or more boot grooves, three or more boot grooves, four or more boot grooves, or even five or more boot grooves. The one or more pockets may be located entirely radially over one or more boot grooves, two or more boot grooves, three or more boot grooves, four or more boot grooves, or even five or more boot grooves. The one or more pockets may partially extend over one or more boot grooves and partially or entirely radially over one or more bores. The one or more pockets may be partially or entirely located over the bores on a trailing side or a leading side of the caliper relative to a bisecting plane. The one or more pockets may extend partially or entirely radially over bores in the trailing side and the leading side. The one or more pockets may be located closer to the bores on the leading side than the bores on the trailing side. The one or more pockets may be located closer to the bores on the trialing side than the bores on the leading side. The one or more pockets may be located in a central region of the inboard side, the outboard side, or both. The one or more bores on the on the inboard side, the outboard side, or both may be asymmetrically located on the inboard side, the outboard side, or both relative to the one or more pockets. The pocket may extend over a different number or amount of pockets on the leading side than the trailing side. For example, the pocket may entirely cover one bore on the leading side and may partially radially cover two bores on the trailing side. A bisecting plane (or line) may extend through the pocket.

A bisecting line may extend through one or more of the bores, two or more of the bores, or three or more bores. The bisecting line may extend through none of the bores. The bisecting plane as discussed herein may separate the caliper into two equal pieces. The bisecting plane may separate the leading side from a trailing side or a leading region from a trailing region. The bisecting plane when viewed in a cross-section may be a bisecting line. Thus, as discussed herein the bisecting line and the bisecting plane are referring to the same separation, but the bisecting line refers to a two-dimensional section and the bisecting plane refers to a three-dimensional section. The pocket may be located entirely on a trailing side or a leading side of the bisecting plane. The pockets may be asymmetrically located relative to the bisecting line. The pockets may be symmetrically located relative to the bisecting line. The bisecting line may pass through the pocket but the amount of pocket located on each side of the bisecting line may not be equally distributed. For example, 40 percent of a pocket may be located on a trailing side of the bisecting plane and 60 percent may be located on a leading side of the bisecting plane. The pocket may have virtually any shape.

The pocket may be round, square, oval, a rhombus, a pentagon, octagon, heptagon, hexagon, diamond, plus shape, trapezium, crescent, semi-circle, ellipse, egg, quatrefoil, curvilinear triangle, trapezoid, parallelogram, kite, heart, seminavette, cathedral shaped, D shaped, or a combination thereof. The pocket may have a non-geometric shape. The pocket may be a depression, a through hole, a flare, or a combination thereof.

A depression may function to be an absence of material without complete removal of all material. A plurality of depressions may be located within the inboard side, the outboard side, or both sides. The plurality of depressions may include one or more depressions in the leading side region, a trailing side region, in a central region, or a combination thereof. A depression in a central region (i.e., a central depression) may be located between one or more other depressions. The inboard side, the outboard side, or both may include one or more depressions or even a plurality of depressions. The one or more depression may be located between one or more through holes. The one or more depressions may be located on one or both sides of a flare. A depression may be a thinning of a wall. A depression may extend into a wall without extending through the wall. The one or more depressions may be any of the shapes discussed herein for a pocket. The one or more depressions may gradually remove material until an apex is formed (i.e., a location with the least material). For example, the depression may be bowl shaped with a thickness of the wall decreasing as the measurements are taken toward the center or apex of the depression. The pocket may have a depressed region that surrounds a through hole. For example, a wall may have a thinning of material and then at one or more locations within the depression a through hole may be present that extends all of the way through the wall.

The one or more through holes function to promote air movement, a localized reduction of mass, thermal transfer, stiffness of the caliper, or a combination thereof. The one or more through holes may extend straight through a wall of the caliper. For example, the walls of the through hole may form a right angle with one or both faces of the wall of the inboard side or the outboard side. The walls of the through hole may taper as the through hole extends through a wall of the caliper. For example, an outboard surface of a wall of the caliper may have a through hole with a larger area than an inboard surface of a wall of the caliper. The wall of the through hole may have an angle of about 1 degree or more, about 3 degrees or more, about 5 degrees or more, 10 degrees or more, or even 12 degrees or more relative to an inboard surface, an outboard surface, or both as the wall of the through hole extends through a wall of the caliper (e.g., a wall on the inboard side or the outboard side). The angle of the wall of the through hole may vary around a perimeter of the through hole. The wall of the through hole may have an angle of about 45 degrees or less, about 30 degrees or less, or about 20 degrees or less relative to an inboard surface, an outboard surface, or both as the through hole extends through a wall of the caliper. The through hole may be located between one or more depressions, one or more other through holes, or both. The through holes may be located on the inboard side, the outboard side, or both. The through holes may be located in a trailing side region, a leading side region, a central region, or a combination thereof. The through holes may be located opposite a depression. For example, if a depression is located in the inboard side then the through hole is located on the outboard side. The one or more through holes may be discrete from a window. For example, a connector bridge may separate a window and a through hole. However, a connector bridge may not be present and the window and the through hole may be combined. The window and through hole may form an open space proximate to the bores. The window and through hole may be connected on the inboard side, the outboard side, or both sides. The through hole and window may be connected by one or more flares.

The one or more flares may function to expand a pocket, a through hole, or both beyond a window. The flares may increase a width of a through hole beyond a width of a window. The flares may create a bulbous portion at an end of a window. The flares may be located in an inboard side, an outboard side, or both. The flares may connect a through hole to a window. The flares may have a wall that may extend at an angle as is discussed herein for the through hole, the teachings of which are incorporated herein for flares. The flare may be a distance that a through hole extends beyond a width of a window. The flare may extend a through hole, a window, or both a distance of 1 mm or more, 2 mm or more, 3 mm or more, 5 mm or more, or even 1 cm or more. The one or more flares, through holes, depressions, pockets, or a combination thereof may be located between the outer bridge at the leading end and the outer bridge at the railing end. The one or more flares may be located in a central region between outer bridges in the leading side and the trailing side.

The one or more outer bridges may function to connect ends of the inboard side and the outboard side together. The one or more outer bridges may be located in the leading region, the trailing region, or both regions. The outer bridges may be the first portion a point on the rotor passes in the leading region and the last portion the point on the rotor passes in the trailing region during rotation of the rotor. The outer bridges may have a complementary shape to the rotor. The outer bridges may include all of or a portion of one or more fastener bores. The outer bridges may include one or more depressions or one or more depressions may be located proximate to the outer bridges in a leading end region, a trailing end region, or both. The outer bridges may include one or more windows, one or more pockets, or both. The outer bridges may be free of windows, pockets, or both.

The one or more windows may function to allow air to flow into the caliper at a location proximate to the bores, brake pads, pistons, rotor, or a combination thereof. The one or more windows may be located in a central region. The caliper may include one or more windows, two or more windows, three or more windows, or even four or more windows. The caliper may include 3, 4, 5, 6, 7, 8, 9, or even 10 windows. Preferably, the caliper has two or more windows. The one or more windows may be separated by one or more bridges. The windows may be located between a bridge and an end bridge or two bridges. The windows may extend only over the rotor. The windows may extend from the leading side to the trailing side. The one or more windows may stop before a wall of the inboard side, the outboard side, or both. The one or more windows may be separated from a pocket by one or more connector bridges. The one or more windows may be extended into a wall of the inboard side, a wall of the outboard side, or both by one or more flares. The one or more windows extend in a straight line from the leading side to the trailing side. The one or more windows may mirror the shape and angles of the bridges. The angles of the bridges may be such that the window has a geometric shape. For example, if there are two bridges and they diverge then the window may have a trapezoid shape. The windows may be formed between two substantially parallel bridges. The windows may have a shape that is square, round, rectangular, ellipse, kite, parallelogram, rhombus, or a combination thereof. Preferably, the windows have a shape so that at least a portion of a window extends above a bore.

The one or more bores may function to house a piston so that the piston moves to create a brake apply. The one or more bores may function to align the piston so that the piston moves substantially axially between a brake on position and a brake off position. The one or more bores may receive fluid. For example, the pistons may be moved by a hydraulic force that pushes the pistons out of the bores. The one or more bores may receive a portion of a mechanical actuator. For example, the pistons may be mechanically moved by motor that is connected to a rotary to linear actuator, which moves the pistons from the bores. The bores may be located within a wall of the inboard side, the outboard side, or both in a pattern that creates a brake apply while substantially evenly wearing the brake pads and the rotor.

The bores may be located in a triangular pattern, square pattern, a "V" pattern, a "W" pattern, "M" pattern, star pattern, trapezoid pattern, upside down trapezoid pattern, or a combination thereof. The pattern may be symmetrical. The pattern of the bores may be slanted to the leading side or the trailing side. For example, the bores may have a "V" pattern but the "V" may be angled toward the leading side. The pattern may be asymmetrical. For example, the pattern may be generally trapezoid shape with a slope of the trapezoid in the leading side being different than a slope of the trapezoid in the trailing side. The bores may be offset relative to a bisecting plane. For example, the bores may be a different distance away from the bisecting plane such that one set of bores are closer to the bisecting plane than a second set of bores. In another example, the set of bores on the trailing side of the bisecting line may have a distance from the bisecting plane that is greater than the set of bores on the trailing side of the bisecting line. The bores on the trailing side may be closer to the bisecting plane than the bores on the leading side. The bores on the leading side may be closer to the bisecting plane than the bores on the trailing side. A center line may extend between the one or more bores on the leading side and the one or more bores on the trailing side. An angle is located between the one or more bores on the leading side and the center line and the one or more bores on the trialing side and the center line. Two bores may be located on the leading side of the center line, two bores may be located on the trailing side of the center line, or both. The angle between the center line and the bores on the leading side is greater than the angle between the bores on the trialing side and then center line. The caliper may have two bores on the leading side and two bores on the trailing side and a line extending between a center of two bores on the leading side and the two bores on the trailing side, and an angle of the line between the two bores on the trailing side, relative to the bisecting plane, may be greater than an angle of the line between the two bores on the leading side, relative to the bisecting plane. The bores may be located at an angle from the bisecting line. The bores may be located at an angle of about 3 degrees or more, about 5 degrees or more, about 7 degrees or more, about 10 degrees or more, about 15 degrees or more from the bisecting line when measured from a radial line that extends from a center of the rotor through a center of the bore. The bores may be located at an angle of about 45 degrees or less, about 30 degrees or less, about 25 degrees or less, or about 20 degrees or less from the bisecting line when measured from a radial line that extends from a center of the rotor through a center of the bore. The bores may be located an angle apart. The angle separating lines that extend through centers of the bores may be about 1 degree or more, about 2 degrees or more, about 3 degrees or more, about 5 degrees or more, about 10 degrees or more, or about 15 degrees or more. The angle separating lines that extend through centers of the bores may be about 45 degree or less, about 35 degrees or less, about 25 degrees or less, about 20 degrees or less, or about 17 degrees or less. The angle between the bores on the leading side may be greater than the angle between the bores on the trailing side or vice versa. The one or more bores may be radially stacked. The two or more bores on the leading side, the two or more bores on the trailing side, or both may be radially stacked, partially radially overlapping, or both. One bore may be located above another bore when extending from a bottom of the caliper to a top of the caliper or in a direction extending outward from a center of a rotor towards an outer edge of the rotor. The one or more bores may partially radially overlap each other. For example, when following a line from a center of a rotor to the outer edge of the rotor a portion of one bore may overlap another bore. One or more of the bores may be free of a radial overlap from another bore. For example, when five bores are present, two bores on a leading side of a bisecting plane may radially overlap and two bores on a trailing side of a bisecting plane may radially overlap and the fifth bore may be located between the two sets of bores and the fifth bore may not be radially overlapped by any other bores. The two or more bores may be radially staggered. One or more bores may be radially staggered relative to one or more bores or two or more bores when a side includes a plurality of bores. All of two or more bores, three or more bores, or four or more bores may be located entirely radially below a pocket. None of two or more bores, three or more bores, or four or more bores may be located partially radially or entirely radially below the pocket. One or more of three or more bores may be located partially radially below a pocket. One or more of the three or more bores may be located entirely radially below the pocket. One or more of the three or more bores are not located partially or entirely radially below the pocket. One or more of the bores may radially overlap one or more of the other bores located on a same side. For example, if a leading side or a trailing side have three bores then one of the bores may radially overlap one or both of the two bores. The bores in the leading region, the trailing region, or both may be located outside of the radial region below a pocket, partially radially below the pocket, entirely radially below the pocket, or a combination thereof. The bores in the leading region may be located outside (i.e., not below) of a region below the pockets and the bores in the trailing region may be located partially radially or entirely radially below the pocket or vice versa.

The bores may be evenly distributed between the leading region and the trailing region. For example, two bore may be in the trialing region and two bores may be in the leading region. The bores in the leading region may be located closer to the pocket than the bores in the trailing region or vice versa. The bores in the leading region and the bores in the trailing region may be equal distance from the pocket. The bores may have a pattern so that the bores are located partially radially or entirely radially under one or more of the pockets, a central pocket, or both. The bores may have a pattern so that the bores are not located radially under a pocket. The bores may be located so that a pocket may be located between sets of bores. For example, the caliper may include four bores and a pocket may be located between the four bores similar to the five spots on a dice. The bores may all be the same size (e.g., diameter). The bores may have different sizes. The bores may have two different sizes. The bores in the leading region may be larger than the bores in the trailing region or vice versa. The bores closer to the top of the caliper may be larger than the bores located at the bottom of the caliper or vice versa. The bore in the top of the trailing region may be the largest of all bores. The bore in the top of the leading region may be the largest of all bores. The one or more bores may be located between a fluid reservoir and a seal groove. The one or more bores may include one or more piston interfaces or the one or more interfaces may be the bore.

The one or more interfaces in a bore may contact the piston. The one or more interfaces may function to axially align the pistons within the bore. The one or more interfaces may function to support the pistons, assist in creating an axial force, or both. The one or more instances may be in close proximity to the pistons so that the interfaces keep the pistons in alignment without preventing axial movement of the pistons. The interfaces may have an interference fit with the pistons. The interfaces may have a slip fit with the pistons. The interfaces may be located in a central region of the bore, at an end of the bore, or both. Preferably, each bore includes at least one interface. More preferably each bore includes two or more interfaces. The interfaces may be of different size. The interfaces may form an annular ring around a piston. The interfaces may be located within the bore proximate to a boot groove, a seal groove, a fluid reservoir, or a combination thereof. An interface may be located on each side of a seal groove. An interface may be located on a side of the seal groove toward an open side of the groove (i.e., seal groove interface).

The seal groove functions to receive a seal that prevent fluid from exiting the bore. The seal groove may form an interference fit with the piston. Preferably, the seal in the seal groove forms an interference fit with the pistons. The seal groove may have a cross-sectional distance that is greater than that of the bore, the interface, the fluid reservoir, or a combination thereof. The seal groove may include an elastomeric or rubber ring (i.e., seal) that fits within the groove and prevents hydraulic fluid from exiting the bore with the piston. The seal groove may assist in retracting the piston. The seal groove may have a cross-sectional distance (i.e., diameter) that is equal to or less than that of the boot groove. The seal groove and boot groove may be separated by an interface (e.g., seal groove interface).

Each bore may include a boot groove. The bores may be free of a boot groove. Some of the bores may include a boot groove and some of the bores may be free of a boot groove. The boot grooves may function to receive a boot that moves with the piston. The boot may prevent debris from contacting the piston, from contaminating the fluid, or both. The boot groove may form a concentric ring around the bore. The boot groove may have a cross-sectional length (e.g., diameter) that is greater than the cross-sectional length of the bore, the seal groove, or both. Each of the boot grooves may be partially radially covered, entirely radially covered, or both by another boot groove, a bore, a pocket, or a combination thereof. None of the boot grooves may be located radially below the pockets. All of the boot grooves may be located entirely radially below the pocket. All of the boot grooves may be located partially radially below the pocket. One or more of the boot grooves may be located partially radially below or entirely radially below the pocket. A plurality of the boot grooves may be located partially radially below or entirely radially below the pocket. Each of the boot grooves may be partially radially or entirely radially located below the pocket and the associated bore may be entirely radially located below the pocket. Any of the patterns discussed herein for the bores apply to the boot grooves as the boot grooves extend around the bores. Thus, if the bore has a "W" pattern and a boot groove is around the bore, the boot grooves also have a "W" pattern. The boot groove has a larger cross-sectional length than the bore (e.g., diameter). The boot groove may have a cross-sectional length that is a factor of about 1.1 or more, 1.2 or more, 1.3 or more, or even about 1.5 or more larger than a cross-sectional length of a bore the boot groove accompanies. The boot groove may have a cross-sectional length that is a factor of about 5 or less, about 4 or less, about 3 or less, or about 2 or less than a cross-sectional length of a bore the boot groove accompanies. Each boot groove is in communication with one piston and moves with the piston as the piston moves axially in and out of the bore.

The one or more pistons function to create a brake apply. The one or more pistons function to move one or more brake pads into contact with a rotor to create a brake apply. The one or more pistons may be metal, phenolic, or both. The one or more pistons axially move to push one or more brake pads into a rotor. Opposing pistons may move opposing brake pads into opposing sides of a rotor. The one or more pistons reside within a bore and pass through a boot groove, a seal groove, or both when moving between a brake on position and a brake off position. The piston may be in contact with a seal groove as the one or more pistons are axially moved by fluid filling the fluid reservoir and creating a force that pushes the piston through an open end.

The fluid reservoir functions to hold fluid and then during a brake apply assists in creating hydraulic pressure that axially moves the piston. The fluid reservoir may be located behind the bore and the fluid reservoir may hold fluid that axially moves the piston through the bore. The fluid reservoir may be sufficiently large so that when a user actuates the brake system the fluid moves the piston. The fluid reservoir may form a terminal end that is located proximate to the bore. The fluid reservoir, seal groove, bore, and piston may all be substantially concentric (i.e., all include a common center). The common center may pass by a location on the rotor forming "a track" along the rotor.

The rotor functions to rotate with a component and then assists in slowing or stopping the component. The rotor when contacted by one or more brake pads is slowed and/or stopped and assists in slowing or stopping the component. The rotor has a radial length. The radial length may be measured from an inner circumference (e.g., a bottom or inner diameter) of a friction surface to an outer circumference (e.g., a top or outer diameter) of a friction surface. The radial length may be a radius of the fiction surface (i.e., the surface that is contacted by the brake pads and is outside of the hat of the rotor). The rotor may have one or more pressure locations created by each of the pistons. The pressure locations may have a center of pressure that corresponds with the common center. Each of these centers creates an imaginary track on the rotor.

The tracks function to illustrate a center of pressure generated by a piston. The tracks function to illustrate the amount of the radial length of the friction surface of the rotor that is used by the brake system. The one or more tracks may all overlap (i.e., create a single ring). The one or more tracks may be non-overlapping (i.e., each bore may have its own ring on the rotor). The tracks may all be concentric. The tracks may not be concentric. There may be two or more tracks, three or more tracks, four or more tracks, five or more tracks, or even six or more tracks. Each bore may have its own imaginary track on the rotor. For example, there may be a track one, track two, track three, track four, track five, and track six. The tracks may extend from an inner circumference of the rotor to an outer diameter of the rotor and the space there between. Each of the tracks may be circumferential. The tracks may be offset relative to each other. The tracks may be on the inboard side and the outboard side. The inboard tracks and the outboard tracks may be mirror images of each other (e.g., overlap). The inboard tracks and the outboard tracks may be offset relative to each other. The inboard tracks and the outboard tracks may be offset in opposite directions. For example, inboard tracks may be offset to the leading side and the outboard tracks may be offset to the trailing side. The tracks may have an effective radius.

The effective radius (e.g., effective circumferential radius) may function to show the average or mean of all of the tracks on the rotor. The effective radius may illustrate the radius of each of the tracks when averaged together. The effective radius may be located substantially in a center of the friction surface of the rotor. Preferably, the effective radius may be a center of an effective mass of a rotor and the tracks may be substantially equally spaced on either side of the effective mass. More preferably, the tracks are equally spaced on opposing sides of the effective mass so that the effective radius of the bores overlaps the effective mass. The effective radius may be located substantially in a center of mass of the friction surface.

The brake system includes one or more brake pads. Each brake pad includes friction material and a pressure plate. The brake system preferably includes a brake pad on each side of a rotor. The brake system includes two or more brake pads. The brake pads are maintained within the brake system by an abutment. The brake system may include one or more abutments or two or more abutments. The abutments prevent rotational movement (i.e., in the direction of rotation of the rotor) of the brake pads during a brake apply when the brake pads contact the rotor. Preferably, each of the brake pads may be connected by an abutment pin. A single abutment pin may be connected to two or more brake pads. The abutments may be an integral part of the caliper. For example, the brake pads may slide into the caliper proximate to one or more abutments, and the abutments may assist in holding the brake pads within the caliper. Preferably, the caliper includes two abutments and each brake pad is inserted between the two abutments. The abutments may be any surface of the caliper that the brake pads move into contact with during rotation of the rotor and the abutments prevent movement of the brake pads in the direction of rotation, transfer a load to the caliper, or both. The abutments may be a flat wall in the caliper. The abutments may be a contoured wall. The abutments may be one or more ledges that the brake pads hang from, are in contact with, or both. A portion of the brake pads may fit within the abutment. The abutments may be one or more abutment pins that contact the brake pad. The abutments and/or abutment pins may be located on a top of the brake pad, a bottom of the brake pad, a trailing side of the brake pads, a leading side of the brake pads, or a combination thereof. Each brake pad may be in contact with one or more abutment pins or two or more abutment pins. The caliper may include both abutment pins and abutment surfaces. For example, during a brake apply the brake pad may move into contact with the abutment pin and then move about the abutment pin into contact with an abutment wall or surface of the caliper. The one or more abutment pins may be connected to the caliper by one or more abutment mounts.

The one or more abutment mounts may receive one or more abutment pins. The one or more abutment mounts function to connect an abutment pin within the caliper. The abutment mounts may be a through hole in the caliper. The abutment mounts may be a threaded through hole in the caliper. The abutment mounts may prevent the abutment pins from moving when a force is applied to the brake pads during a braking event. The abutment pins, abutment mounts, or both may carry a load during a forward braking event, a reverse braking event, or both. The one or more abutment mounts may be a through hole. One of the abutment mounts may be a partial through hole. The abutment mounts may be located in the inboard side, the outboard side, or both. The abutment mounts, abutment pins, abutments, or a combination thereof may work in conjunction with one or more clip mounts, clips (e.g., abutment clips or pad clips), or both.

The one or more clip mounts function to carry a clip (e.g., abutment clip or pad clip). The one or more clip mounts function to support a clip that prevents one or more brake pads from rotating into the windows during forward braking, reverse braking, or both. The one or more clip mounts may be connected to one or more bridges, one or more connector bridges, one or more outer bridges, or a combination thereof. Preferably, the one or more clip mounts are part of the bridge. The one or more clip mounts may extend cantilever from the bridge or form a cantilever connection with the bridge. The clip mount may have a connection side and a support side. The support side may attach to the bridge. Preferably, the connection side is connected to the bridge. The connection side may receive and connect to the clip. The one or more clip mounts may extend over or with a plane of a window. The one or more clip mounts may include one or more hooks, lips, or both that form a fixed connection with a clip. The one or more clip mounts may extend from the lading direction toward the trailing direction. The one or more clip mounts may extend over the rotor. The clip mount may connect to a clip and support the clip over a rotor that extends between the inboard side and the outboard side. The one or more clip mounts may extend from one bridge to another bridge. The one or more clip mounts may have a constant width, thickness, or both along their length. The one or more clip mounts may taper as the clip mount extends from the connection side to the support side. The one or more clip mounts may taper as the clip mounts extend away from a bridge. The one or more clip mounts may decrease in thickness as the clip mounts extend away from the bridge. The one or more clip mounts may have a shape that is square, trapezoid, triangular, semi-circular, rectangular, or a combination thereof. The one or more clip mounts may connect one or more clips to the caliper, the ridge, or both. The one or more clips may be free of contact with the brake pads during a forward braking event (i.e., the rotor is rotating in the forward direction). The one or more clips may contact the brake pads during a reverse braking event. The one or more clips may prevent the brake pads from contacting the bridges.

The following figures may not be to scale and are for illustrative purposes only and should not be interpreted as limiting the claims. For example, if a figure discusses a bore on the trailing side having a relationship with a pocket these teachings are contemplated as being extended to a bore on the leading side having the relationship with the pocket. More specifically, if a figure shows trailing bores being partially or entirely overlapped by a pocket, the teachings contemplate, that the positions of the trailing bores and the leading bores relative to the pocket can be exchanged such that the leading bores are partially or entirely overlapped by the pocket. Similarly, discussions below with regards to the inboard side can be applied to the outboard side and vice versa.

FIG. 1 is a perspective view of an inboard side 6 of a caliper 2. The caliper 2 includes a leading side 8 and a trailing side 10, each with an outer bridge 28. A pair of bridges 20 are centrally located within the caliper 2. A window 30 is located between the bridges 20 and a window 30 is located between each of the bridges 20 and outer bridges 28. A plurality of bores 40 are located on the inboard side 6. An abutment pin 60 is located on the leading side 8 of the caliper 2 to attach a brake pad (not shown) within the caliper, and a clip mount 70 extends above the outer bridge 28.

Figure 2:
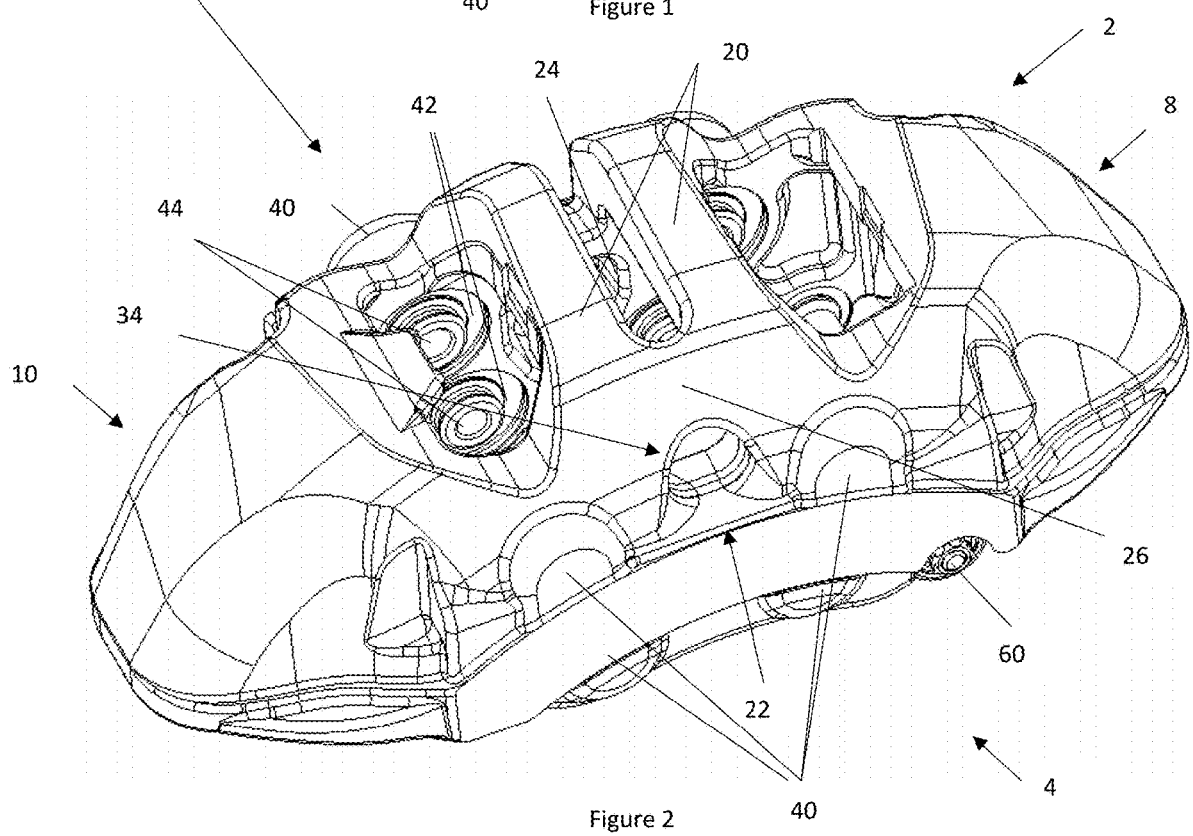
FIG. 2 is a top perspective view of an outboard side of a caliper.

FIG. 2 is a perspective view of an outboard side 4 of a caliper 2. The caliper 2 includes a leading side 8 and a trailing side 10. The outboards side 4 includes a plurality of cylinder bores 40 and a pocket 34 that is a through hole 22 located proximate to all of the plurality of cylinder bores 40. The through hole 22 is formed by a connector bridge 26 extending between and connecting the bridges 20 together. The plurality of cylinder bores 40 on the outboards side 4 oppose a plurality of cylinders 40 on the inboard side 6. Each of the cylinder bores 40 include a piston 44 with a piston boot 42 around each of the pistons 44. The inboard side 6 includes a depression 24 between the cylinder bores 40. A abutment pin 60 is located on the outboard side 4 of the leading side 8.

Figure 3:
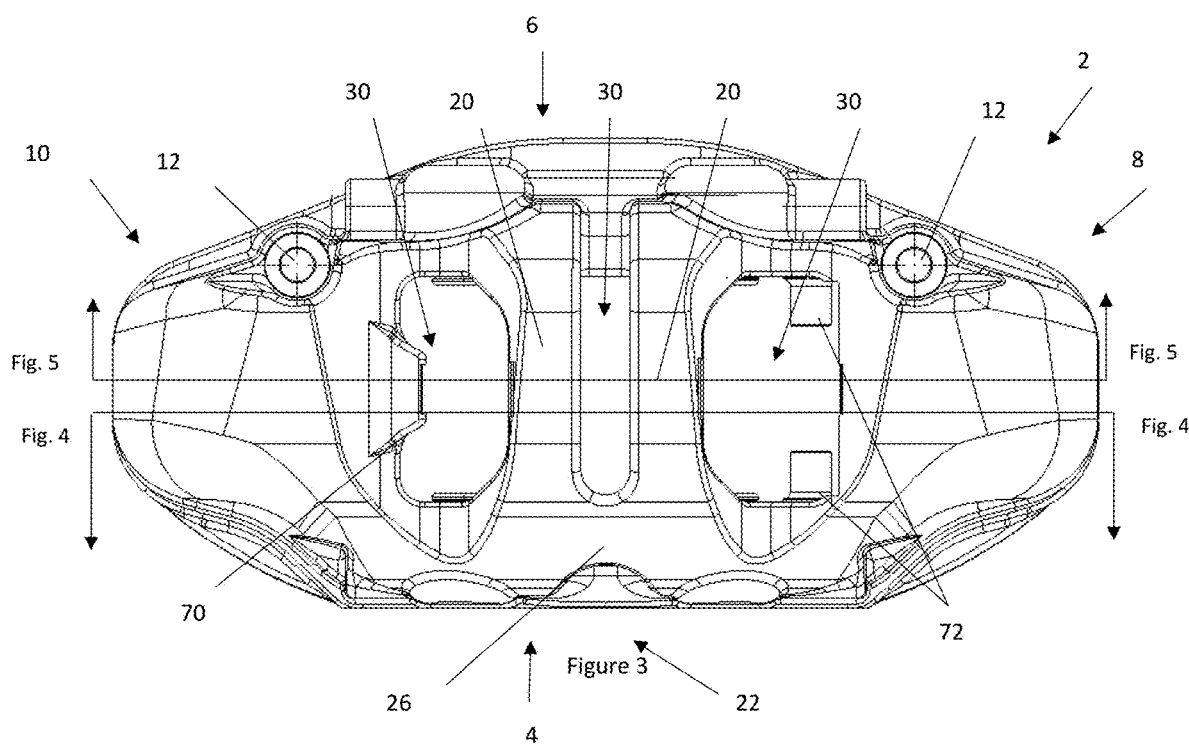
FIG. 3 is a top view of a caliper.

FIG. 3 is a top view of a caliper 2. The bridges 20 extend between the inboard side 6 and the outboard side 4 and are connected together on the outboard side 4 by a connector bridge 26 so that a through hole 22 is formed. Windows 30 are located the sides of the bridges 20 and between two of the bridges 20. The window 30 between the two bridges 20 is open on the inboard side 6. The inboard side 6 also includes fastener bores 12 that connect the caliper 2 to a knuckle or vehicle (not shown). A clip mount 70 extends over the window 30 at the trailing side 10 and a pair of opposing abutment mounts 72 are visible in the window 30 at the leading side 8.

Figure 4:
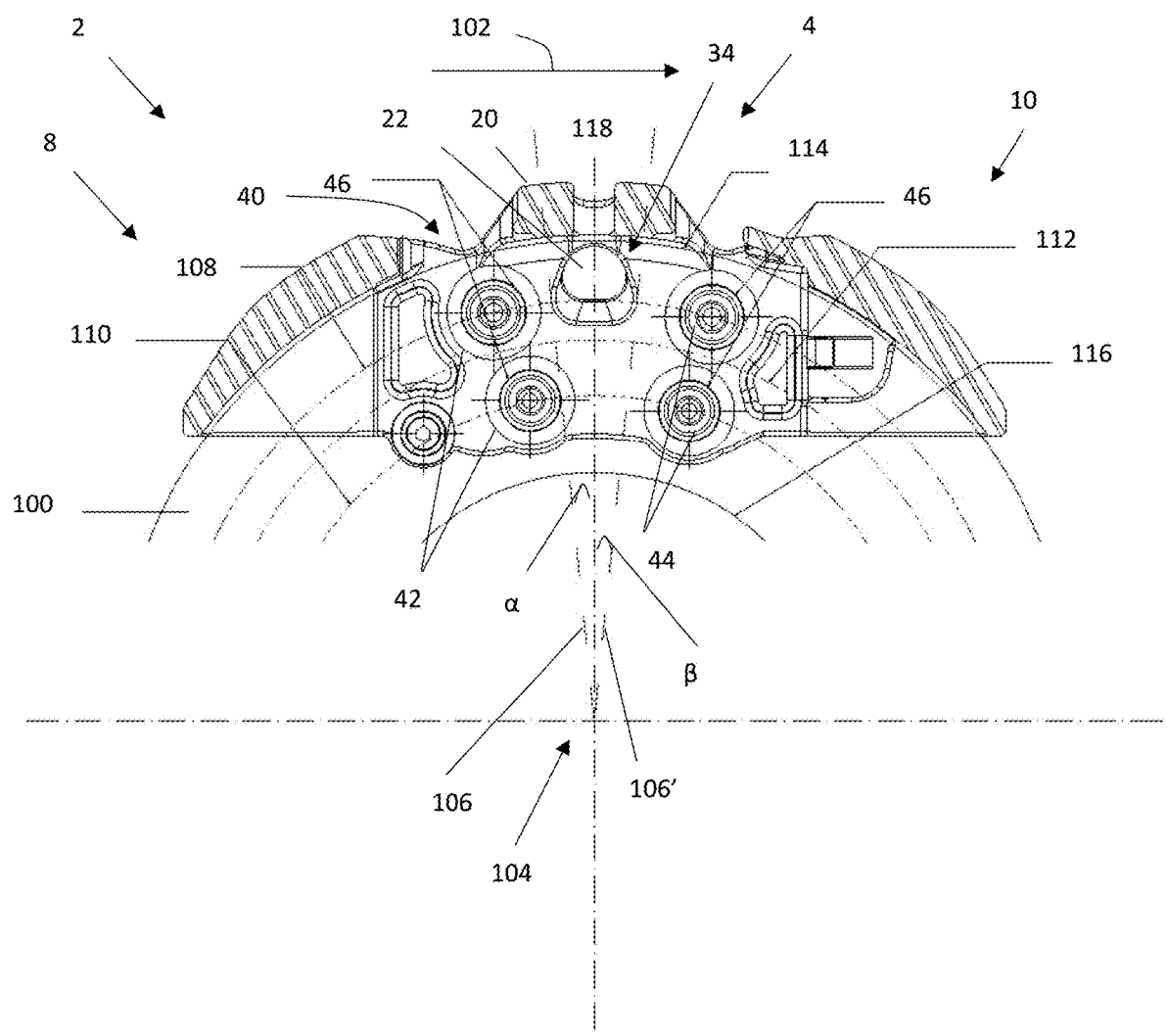
FIG. 4 is a cross-sectional view of FIG. 3 cut along line 4-4.

FIG. 4 is a cross-sectional view of an outboard side 4 of the caliper 2 of FIG. 3 along line 4-4. As shown, the caliper 2 includes a pair of bores 40 including pistons 44 and boot grooves 42 on a leading side 8 and a trailing side 10 or a line 118 that bisects the caliper 2. A bridge 20 is located on each side of the line 118, and the line 118 extends through a through hole 22 between the bridges 20. The pistons 44 are in contact with an interface 46 of the bore 40. The bores 40 on the leading side 8 and the trailing side 10 are radially stacked, relative to an inner ring 116 and an outer ring 114 of the rotor 100. The rotor 100 rotates in the direction 102. The pistons 44 are located radially inward (i.e., towards the inner ring 116) and sit on common piston track one 108 and the pistons 44 located radially outward (i.e., towards the outer ring 114) sit on common piston track two 110. An effective radius 112 of the pistons 44 extend between track one 108 and track two 110. The rotor 100 has a center 104 that is aligned with the bisecting line 118. The line 118, as shown, bisects a pocket 34, which as shown is a through hole 22, and a radially extending line (106, 106') is shown one each side of the through hole 22 and each of the radially extending lines contacts an edge of the through hole 22. The line 106 on the leading side 8 of the line 118 forms an angle (α) with the line 118 and extends over a portion of the boot grove 42 but the piston 44 and bore 40 is entirely located on the leading side of the line 106 so that the line extends between the bore 40 and the through hole 22. The line 106' on the trailing side 10 of the line 118 forms an angle (β) with the line 118 and extends between the through hole 22 and the bore 40, boot groove 42, and piston 44.

Figure 5:
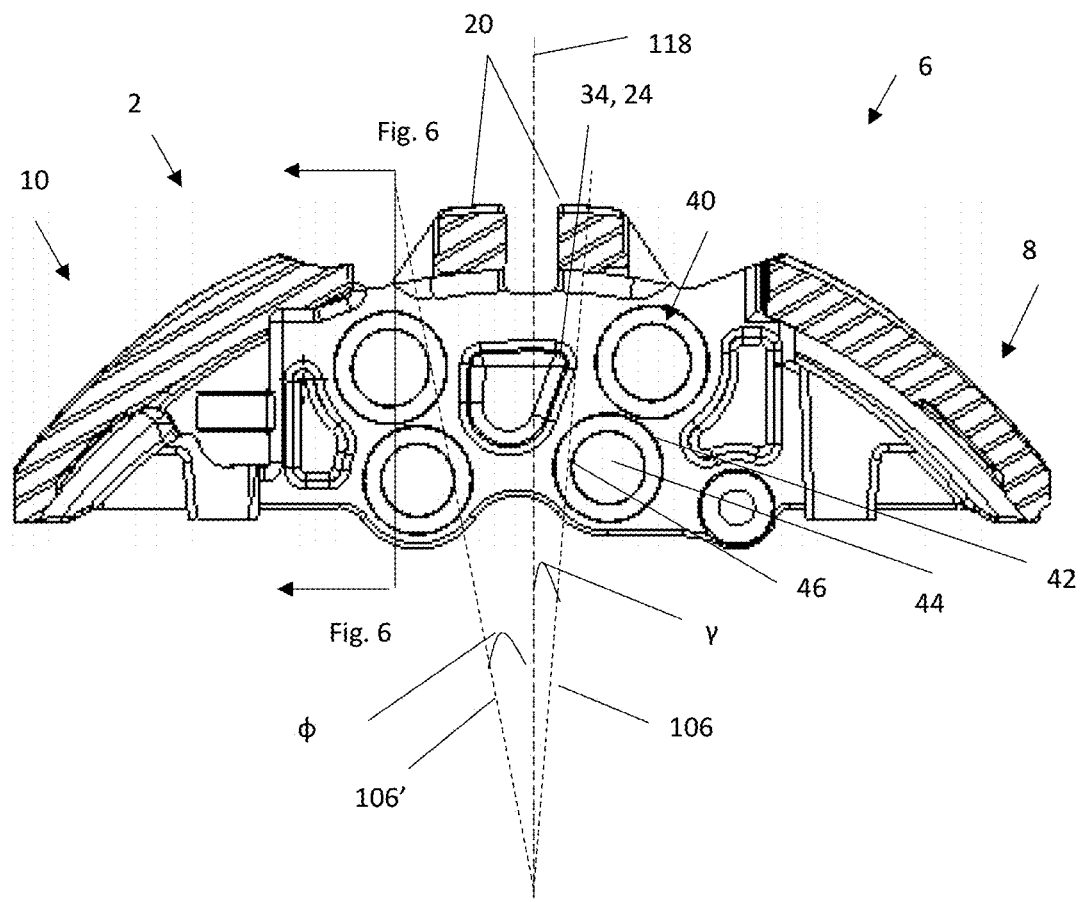
FIG. 5 is a cross-sectional view of FIG. 3 cut along line 5-5.

FIG. 5 is a cross-sectional view of an inboard side 6 of the caliper 2 of FIG. 3 along line 5-5. A line 118 bisects the caliper 2 and extends from a center of a rotor (not shown). The line 118 extends through a pocket 34, which as shown is a depression 24, and between bridges 20 in the caliper 2, which is located generally in the center of the four pistons 44, but is aligned towards the trailing side 10 of the piston 2. Each of the pistons 44 are located in a bore 40. The bore 40 and the piston 44 are in contact at an interface 46. A boot groove 42 extends radially outward of the piston 44 and the bore 40. The pistons 44 on the leading side 8 are located closer to the bisecting line 118 than the pistons 44 on the trailing side 10. The pair of bores 40 on the leading side 8 are located outward from the bisecting line 118 in the radial direction 106, where the line depicting the radial direction 106 is located a distance (γ) from the bisecting line 118. The pair of bores 40 on the trailing side 10 are located outward from the bisecting line 118 in the radial direction 106', where the line depicting the radial direction 106' is located a distance (φ) from the bisecting line.

Figure 6:
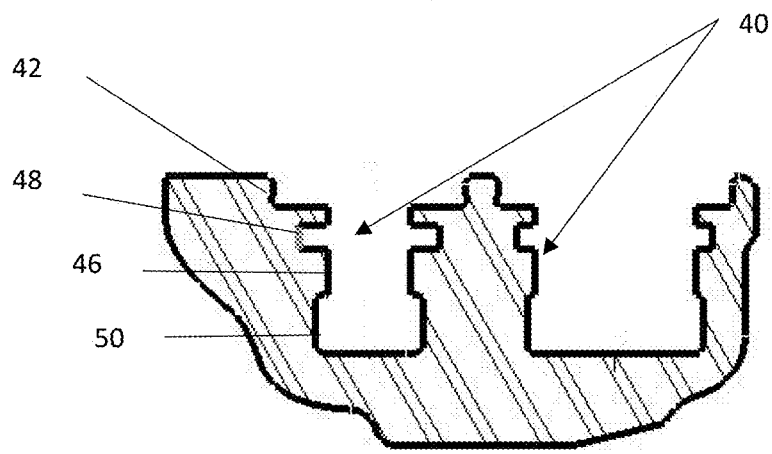
FIG. 6 is a cross-sectional view of FIG. 5 cut along line 6-6.

FIG. 6 is a cross-sectional view of a portion of FIG. 5 cut along line 6-6. The bore 40 includes an interface 46, which contacts a piston (not shown), and a fluid reservoir 50 that assists in moving the piston. A seal groove 48 and boot groove 42 are located outward of the bore 40. The seal groove 48, boot groove 42, and bore 40 are all concentric.

Figure 7:
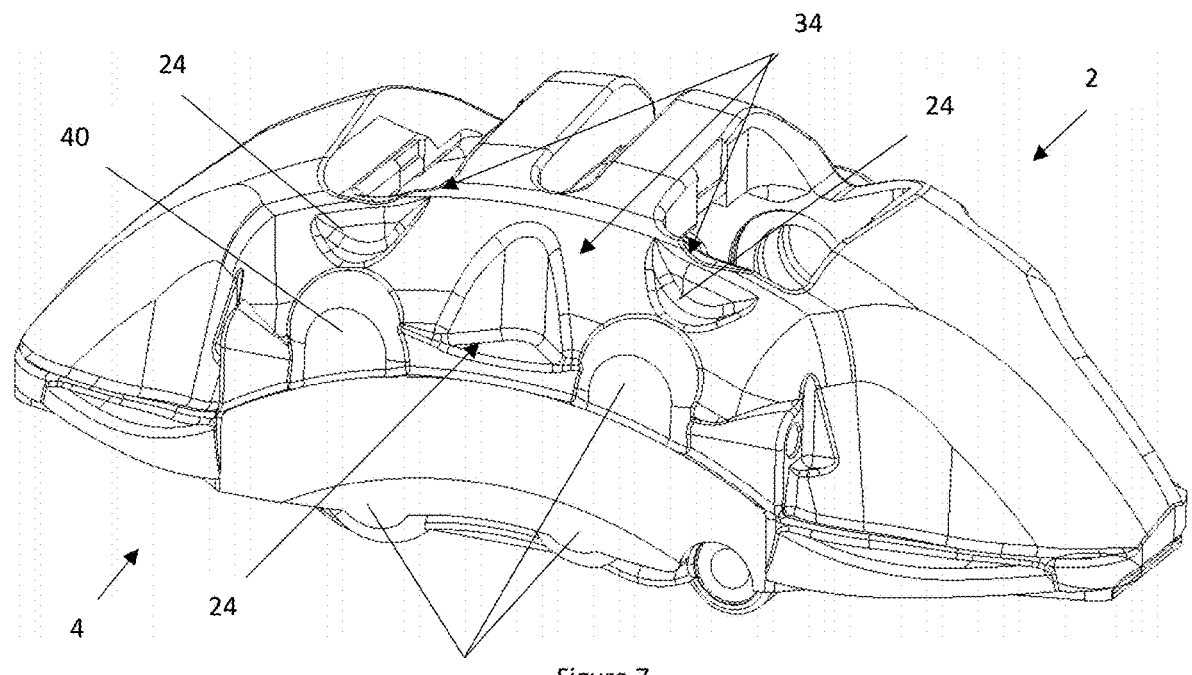
FIG. 7 is a perspective view of an outboard side of a caliper.

FIG. 7 illustrates an outboard side 4 of the caliper 2 with a plurality of pockets 34 that are depressions 24 as shown. A depression 24 is located in the center between the pistons 40 and a pair of depressions 24 at least partially radially overlap the pistons 40.

Figure 8:
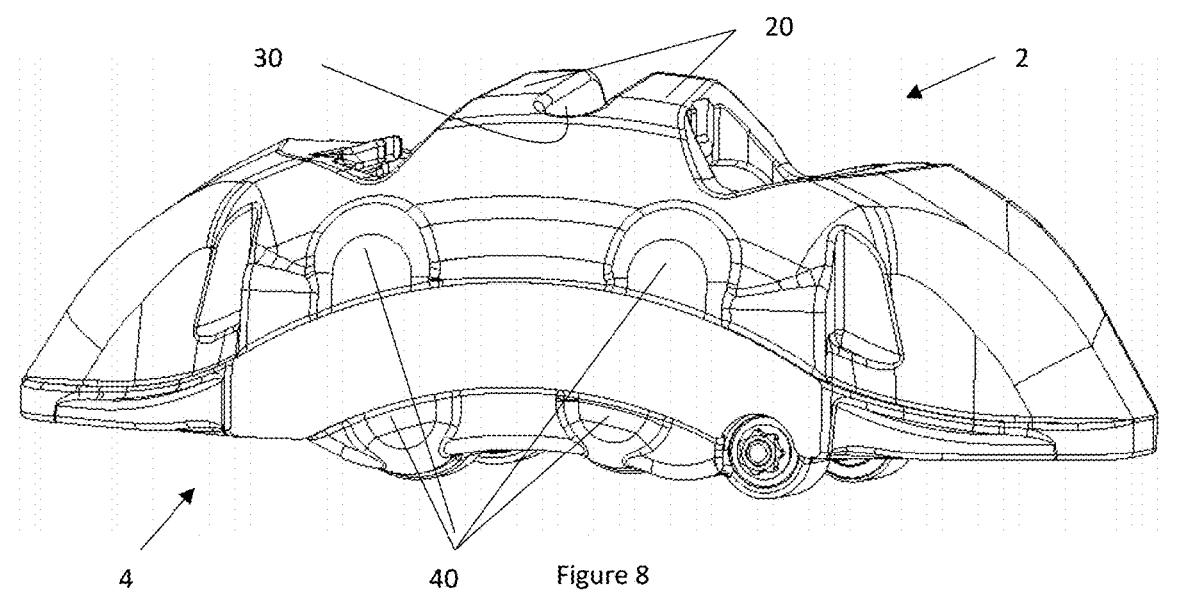
FIG. 8 is a plan view of an outboard side of a caliper.

FIG. 8 illustrates an outboard side 4 of a caliper 2 with an outside of bores 40 shown. The caliper 2 includes bridges 20 with a window 30 between the bridges 20. The caliper 2 is free of any pockets 34 and the bridges 20 and window 30 are located partially radially inward of the bores 40.

Figure 9:
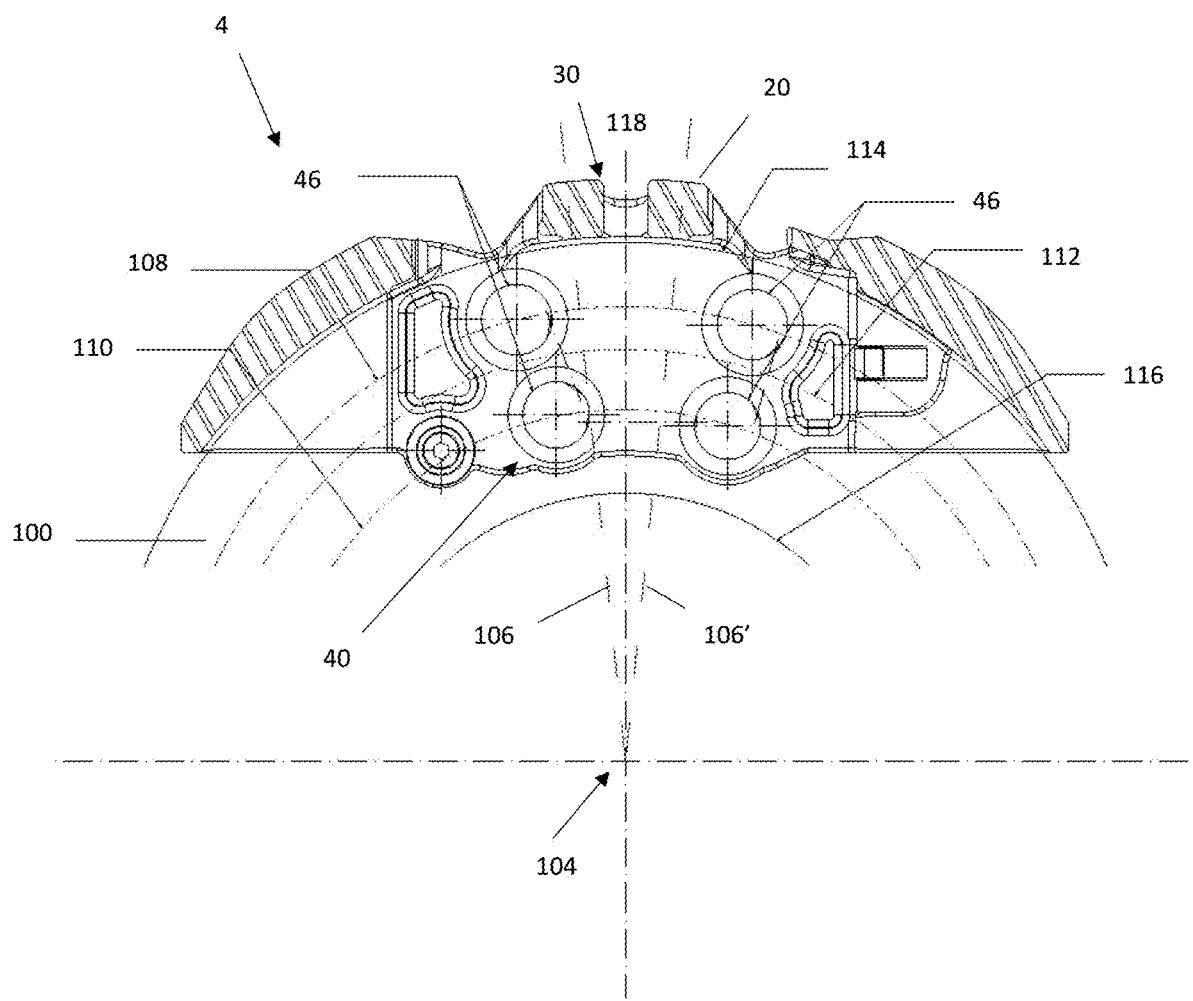
FIG. 9 is a cross-sectional view of an interior of the outboard side of FIG. 8.

FIG. 9 is a cross section of the outboard side 4 of FIG. 8. The outboard side 4 has four piston bores 40 that each include an interface 46. A center of each bore 40 sits on a track. Radially inward bores 40 located proximate an inner ring 116 of a rotor 100 sit on piston track two 110. Radially outward bores 40 located proximate to an outer ring 114 of a rotor 100 sit on piston track one 108. A rotor effective radius 112 extends between rotor track one 108 and rotor track two 110. A bisecting line 118 extends between a pair of bridges 20 and through a window 30. The bisecting line 118 extends from a center of rotation 104 of the rotor 100. A radial direction line 106 extends from the center 104 of the rotor 100 and the line 106 extends along an edge of the bore 40 illustrating that a portion of the bridge 20 is located above one of the bores 40.

Figure 10:
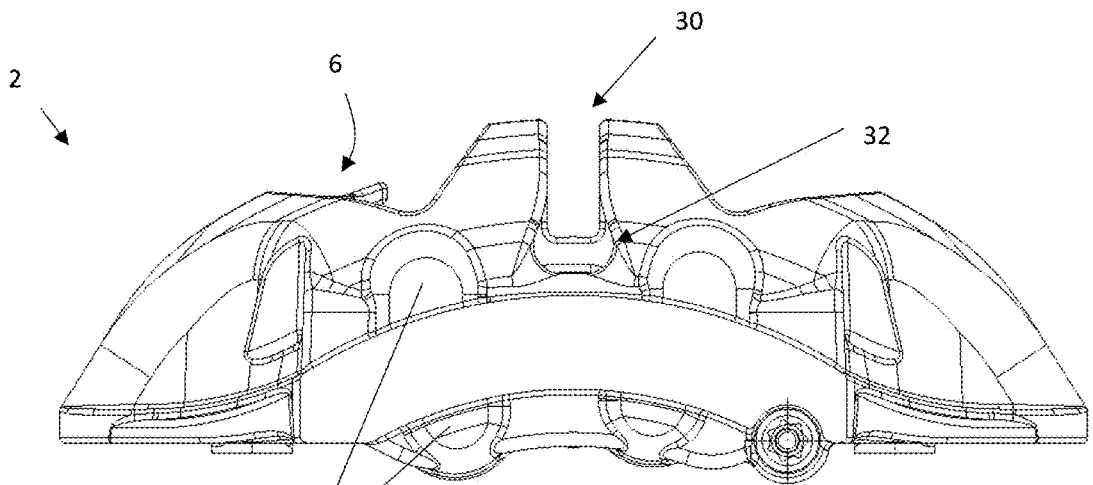
FIG. 10 is a plan view of an outboard side of a caliper.

FIG. 10 illustrates a caliper 2 including a window 30 that continuously extends from an inboard side 6 to an outboard side 4. The window 30 extends between the top two pistons 40 and stops above the bottom two pistons 40. The window 30 includes a flare 32 that opens outward and is larger than the width of the window 30.

Figure 11:
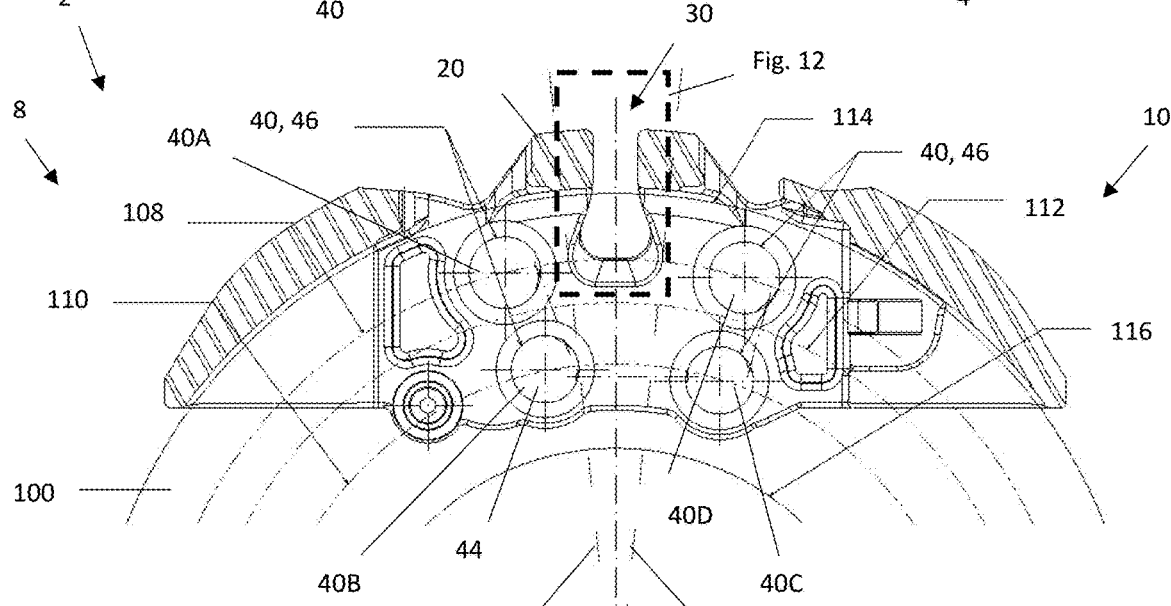
FIG. 11 is a cross-sectional view of an interior of the outboard side of FIG. 10.

FIG. 11 is a cross-sectional view of the caliper 2 of FIG. 10. The caliper 2 includes a leading side 8 and a trailing side 10 such that as the rotor 100 rotates, the rotor 100 passes by the leading side 8 first. The caliper 2 includes bores 40 that house pistons 44 that are in contact with an interface 46 of a bore 40, which assists the pistons 44 into moving during a braking event to slow and/or stop the rotor 100. The rotor 100 has a first piston track 108 that substantially aligns with the upper two pistons 44 (e.g., first leading piston 44A and first trailing piston 44D), and a second piston track 110 that substantially aligns with the two lower pistons 44 (e.g., second leading piston 44B and second trailing piston 44C). The first piston track 108 is located proximate to the outer ring 114 of the rotor 100 and the second piston track 110 is located proximate to the inner ring 116 of the rotor 100. An effective radius 112 is formed between the first piston track 108 and the second piston track 110. The rotor 100 includes a center 104. A radial extending leading line 106 extends from the center 104 of the rotor 100 and along the interface 46, and a radial extending trailing line 106' extends from the center 104 and along a trailing side of the window 30 between the two bridges 20 such that the window is not located radially above any of the pistons 44.

Figure 12:
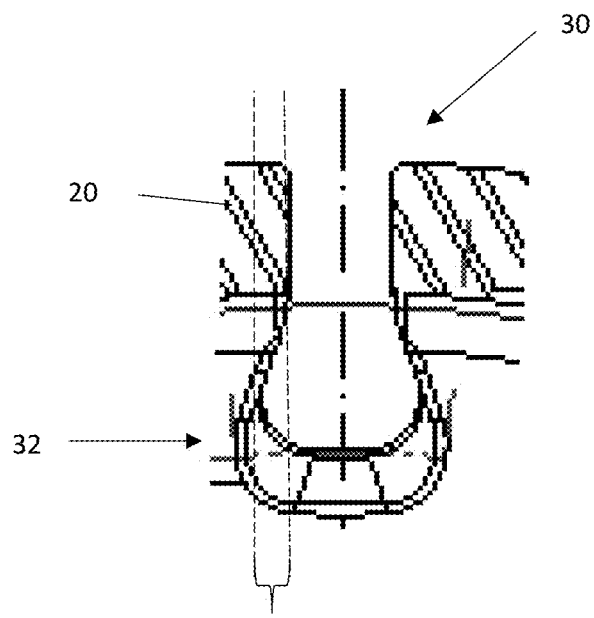
FIG. 12 is a close up view of the flare of FIG. 11.

FIG. 12 is a close up view of the window 30 of FIG. 11. The window 30 includes a flare 32 that extends outward a distance (D) from the region that extends between the bridges 20.

Figure 13:
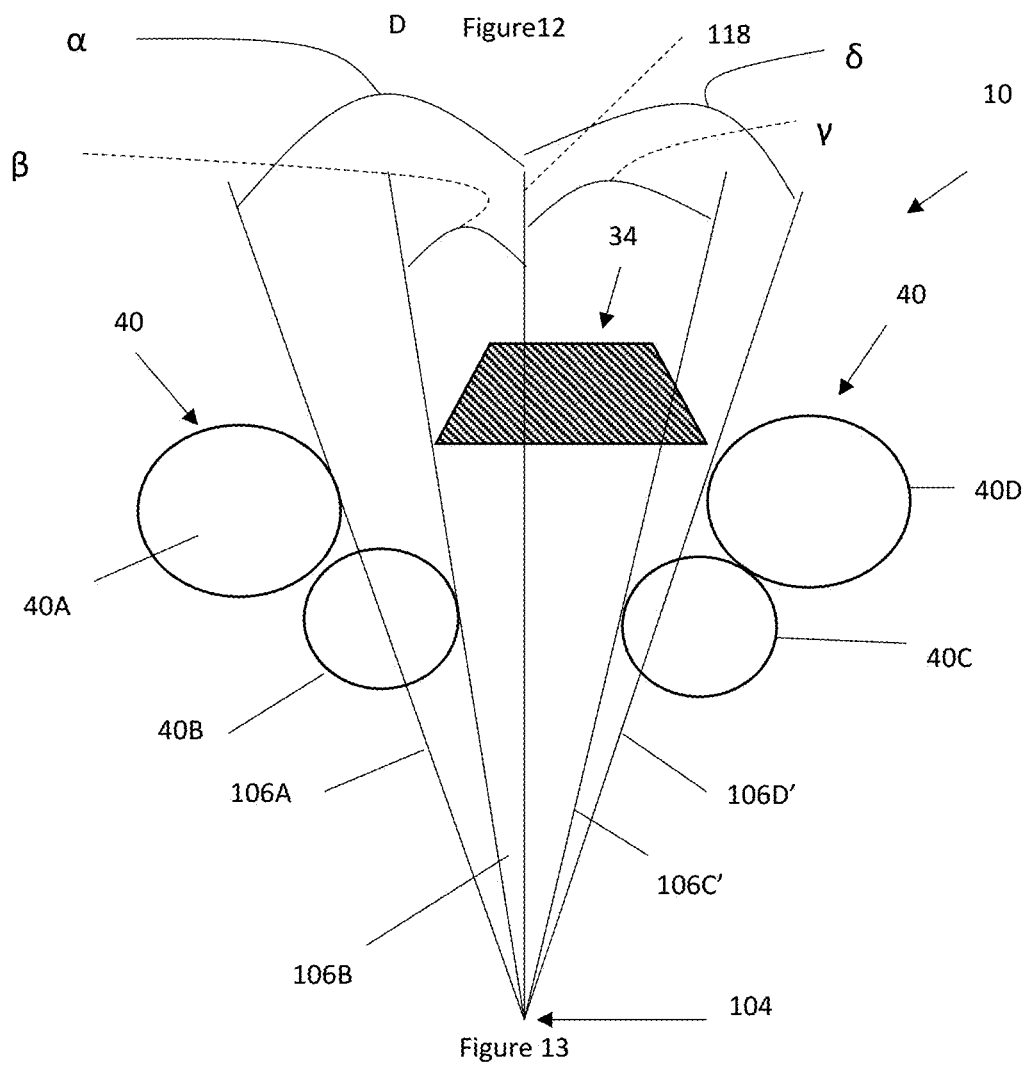
FIG. 13 illustrates locations of a pocket and bores with the pocket partially radially extending over a bore.

FIG. 13 illustrates the relationship of the bores 40 relative to the pocket 34. The pocket 34 as shown is offset to the trailing side 10 of the bisecting line 118, which extends upward from a center 104 of a rotor (not shown). There are two radially stacked bores 40 on each side of the bisecting line 118. A radially outward line is shown from the center 104 and into contact with a wall of the bore 40. The first leading bore 40A has a first radial direction leading line 106A that forms an angle (α) with the bisecting line 118, and the second leading bore 40B has a second radial direction leading line 106B that forms an angle (β) with the bisecting line 118 and demonstrates that the pocket 34 is not located radially above the first leading bore 40A or the second leading bore 40B. The first trailing bore 40C has a first radial direction trailing line 106C' that forms an angle (γ) with the bisecting line 118 and illustrates that the first trailing bore 40C is located partially radially under the pocket 34. The second trailing bore 40D has a second radial direction trailing line 106D' that forms an angle (δ) with the bisecting line 118 and illustrates that the second trialing bore 40D is not overlapped (or located below) the pocket 34. The first leading bore 40A is located above the second leading bore 40B and the second trailing bore 40D is located above the first trailing bore 40C and the first leading bore 40A and the first trailing bore 40C have a larger diameter than the second leading bore 40B and the second leading bore 40D respectively.

Figure 14:
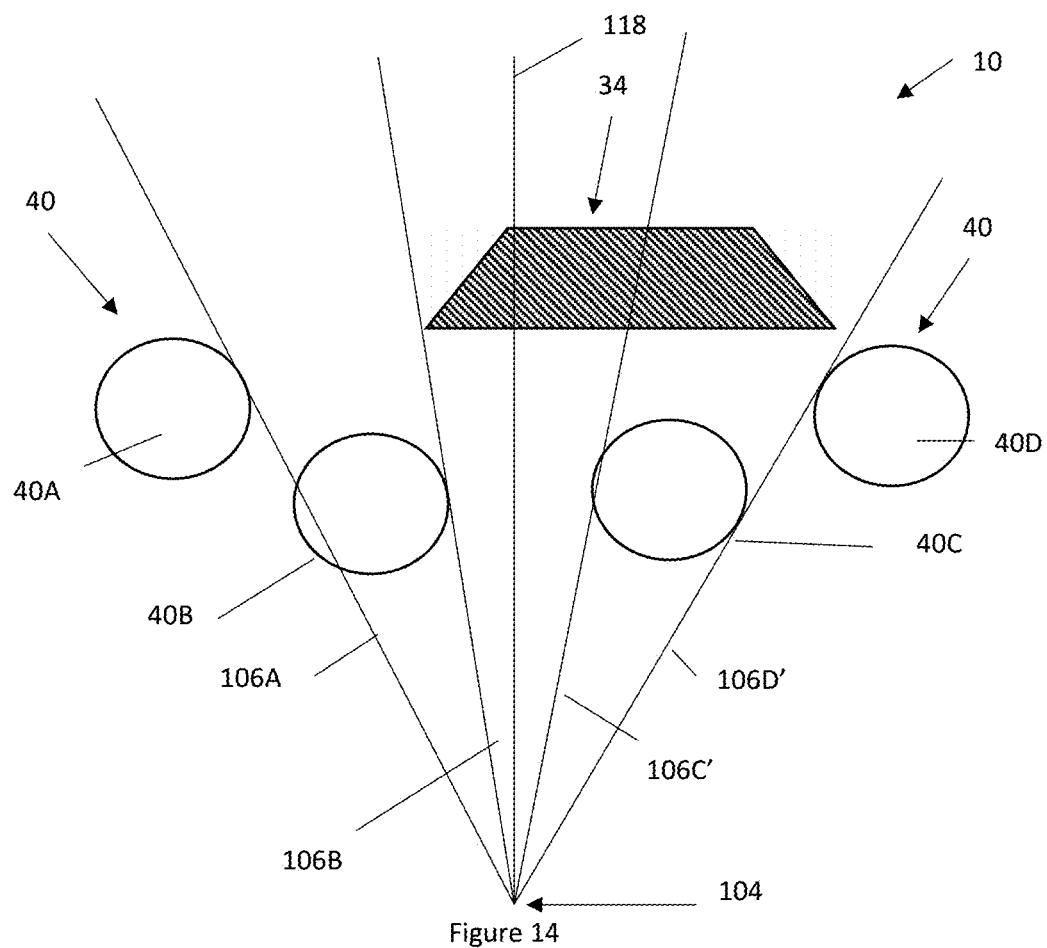
FIG. 14 illustrates a pocket entirely radially extending over a bore.

FIG. 14 illustrates the relationship of the bores 40 relative to the pocket 34. The pocket 34 as shown is offset to the trailing side 10 of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A or the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is not overlapped (or located below) the pocket 34.

Figure 15:
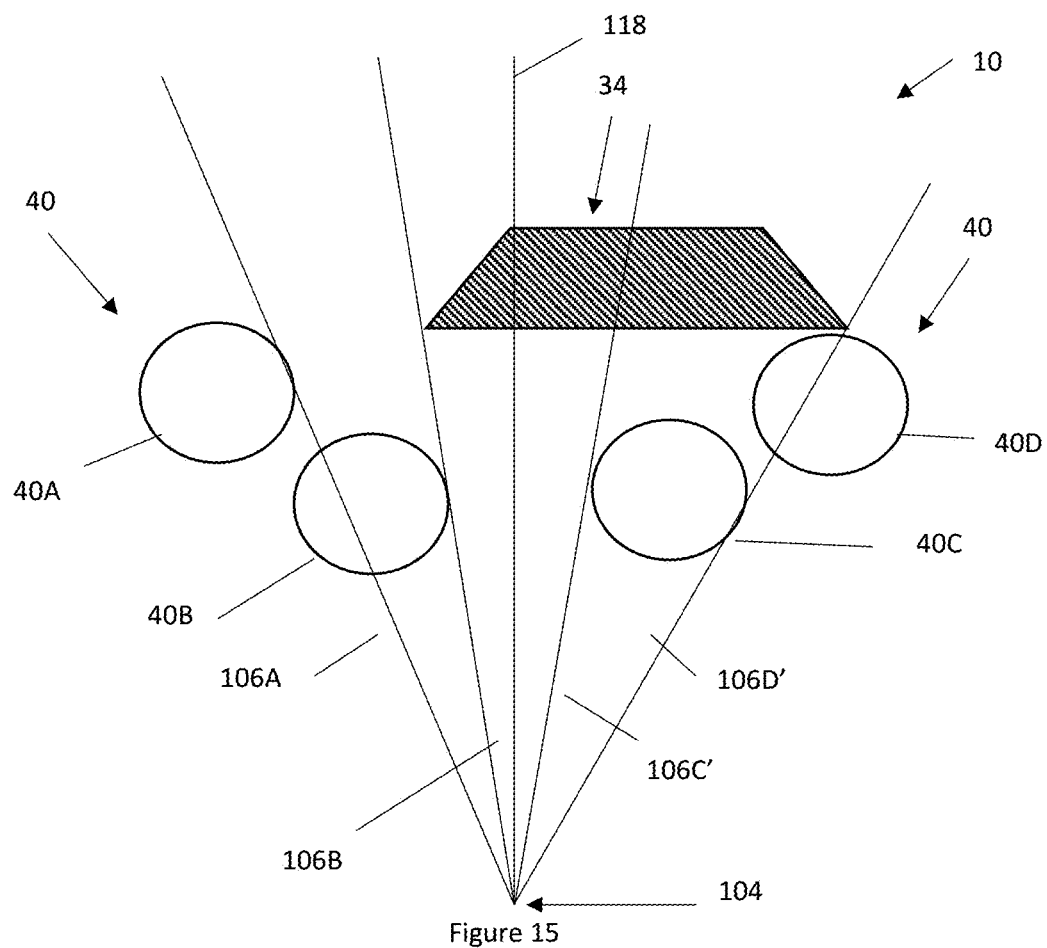
FIG. 15 illustrates a pocket partially radially extending over a bore and entirely radially over extending over a bore.

FIG. 15 illustrates the relationship of the bores 40 relative to the pocket 34. The pocket 34 as shown is offset to the trailing side 10 of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A or the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is partially overlapped (or located below) the pocket 34.

Figure 16:
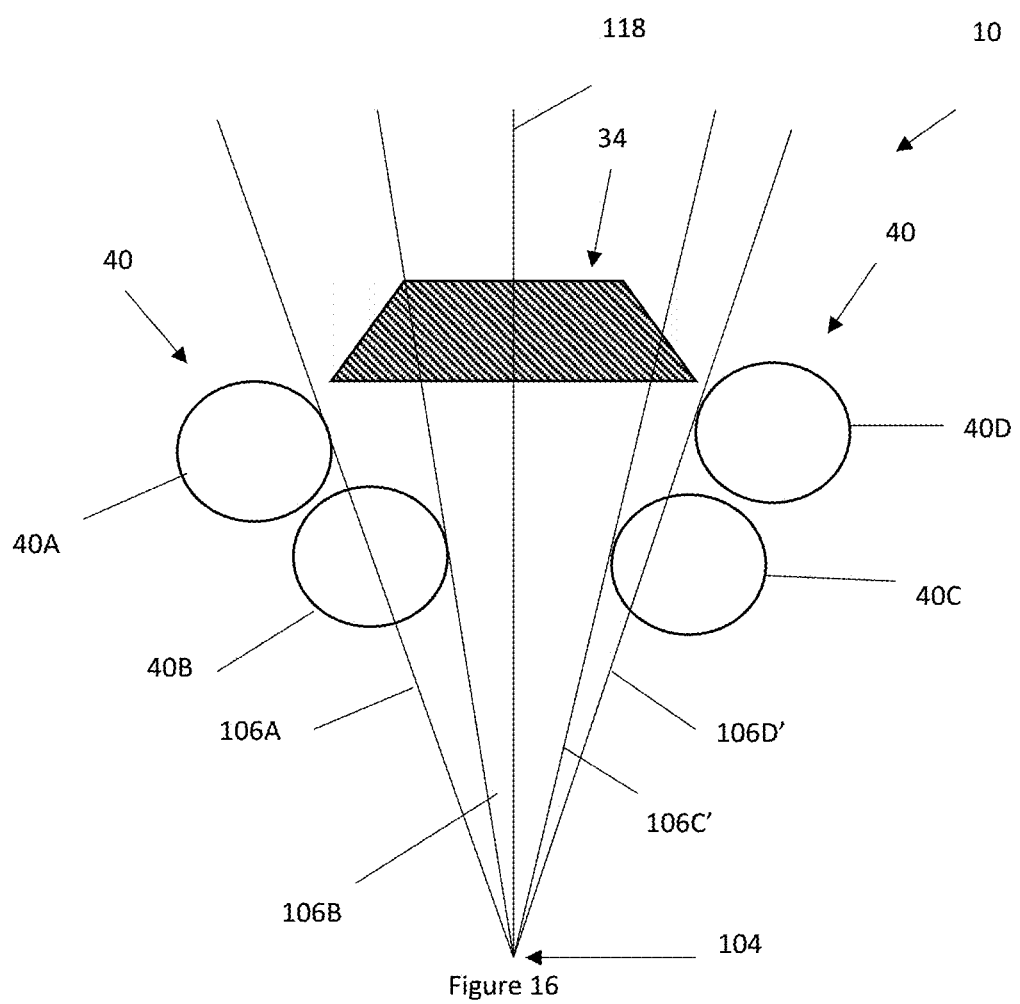
FIG. 16 illustrates a pocket partially radially extending over two bores.

FIG. 16 illustrates the relationship of the bores 40 relative to the pocket 34. The pocket 34 as shown is substantially equally located on each side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A and is located partially radially above the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is not overlapped (or located below) the pocket 34.

Figure 17:
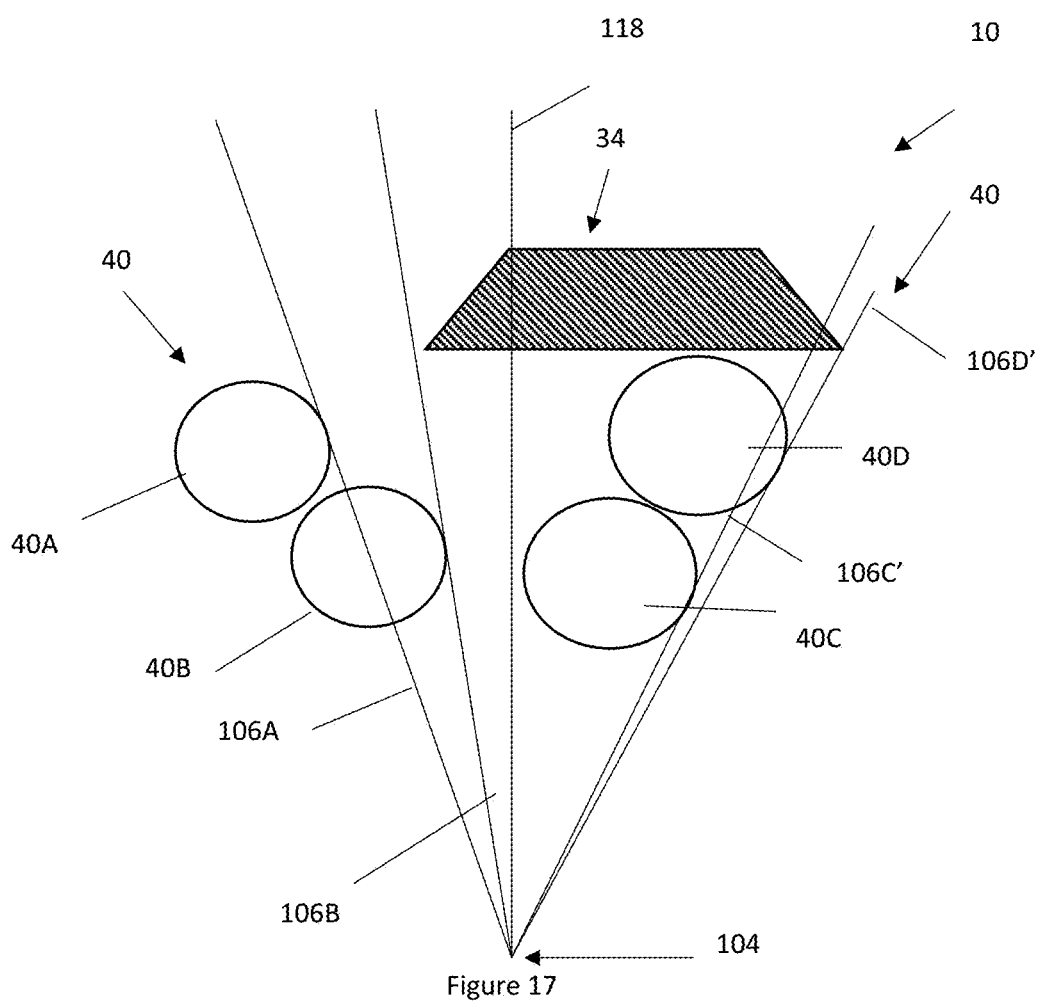
FIG. 17 illustrates a pocket entirely radially extending over two bores.
Figure 18:
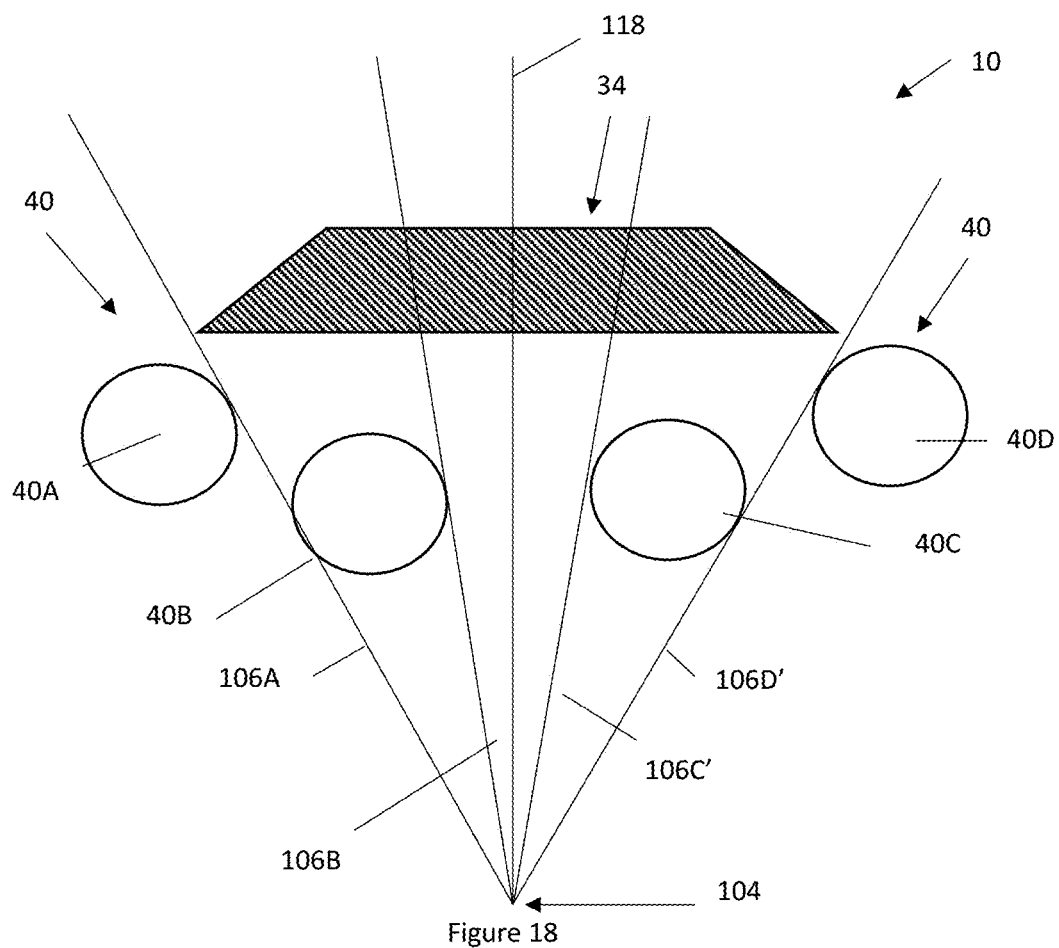
FIG. 18 illustrates a pocket entirely radially extending over two bores.

FIG. 17 illustrates the relationship of the bores 40 relative to the pocket 34. The pocket 34 as shown is shifted to the trailing side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A or the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is entirely overlapped (or located below) the pocket 34. As shown the first trailing bore 40C and the second trailing bore 40D are larger than the first leading bore 40A and the second leading bore 40B FIG. 18 illustrates the relationship of the bores 40 relative to the pocket 34. The pocket 34 as shown is substantially evenly distributed on each side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A and is located entirely above the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is not overlapped (or located below) the pocket 34.

Figure 19:
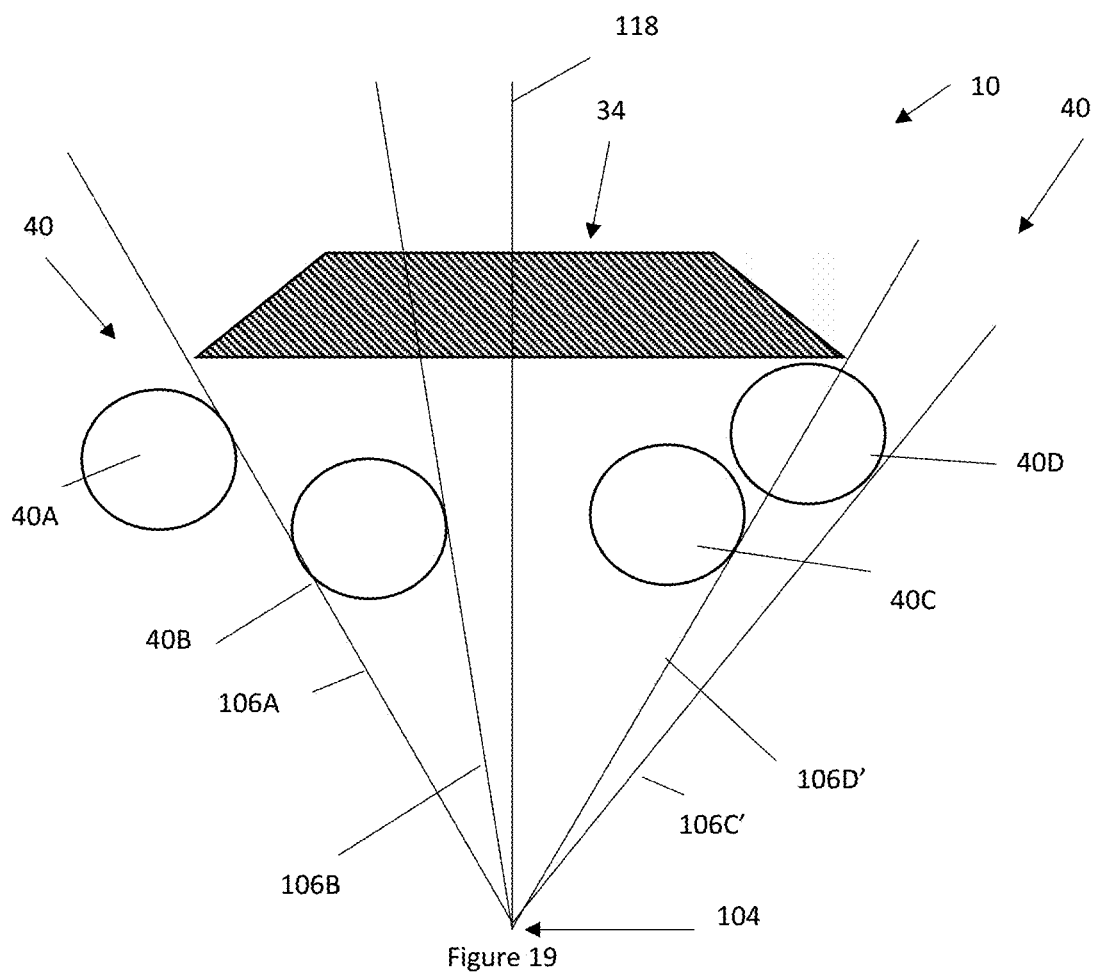
FIG. 19 illustrates a pocket entirely radially extending over two bores and partially extending over a bore.

FIG. 19 illustrates the relationship of the bores 40 relative to the pocket 34. The pocket 34 as shown is substantially evenly distributed on each side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A and is located entirely above the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trailing bore 40D is partially overlapped (or located below) the pocket 34.

Figure 20:
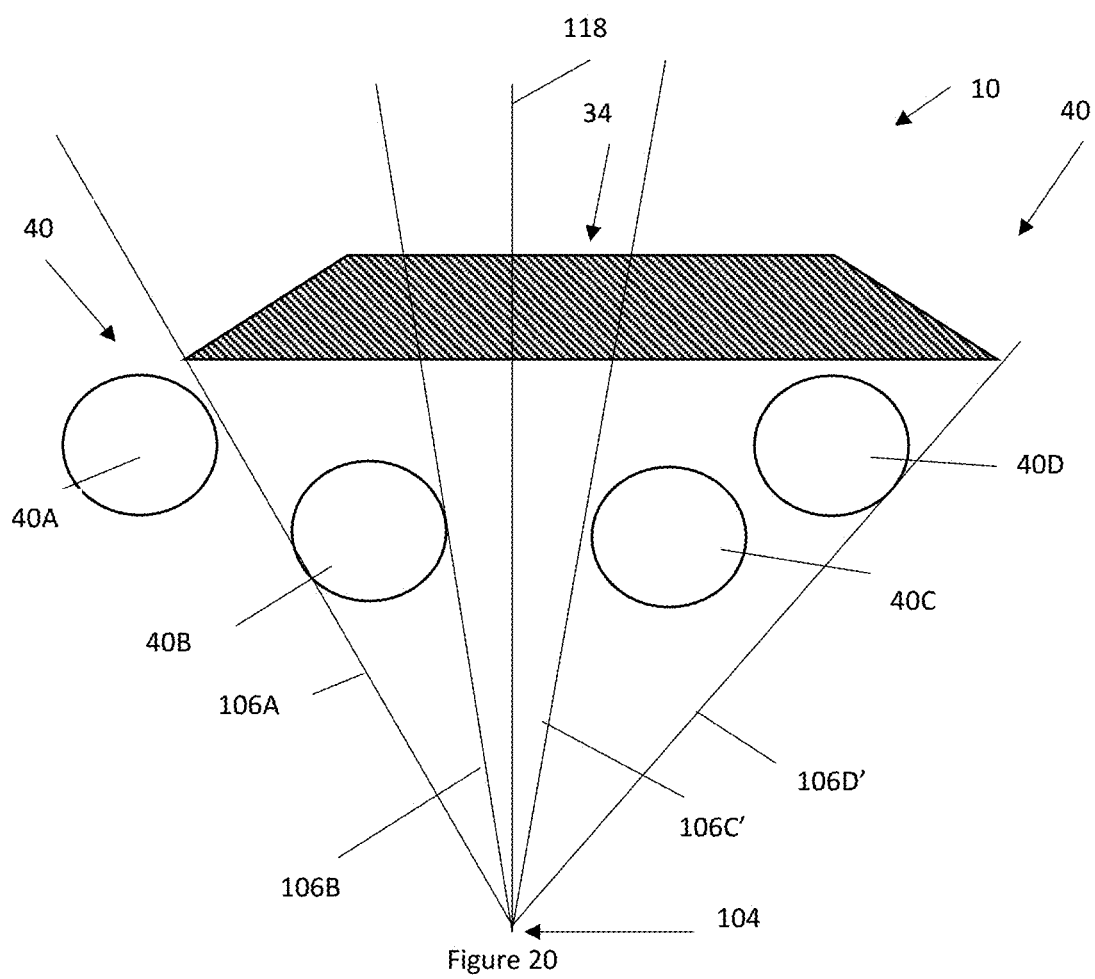
FIG. 20 illustrates a pocket entirely radially extending over three bores.

FIG. 20 illustrates the relationship of the bores 40 relative to the pocket 34. The pocket 34 as shown is substantially evenly distributed on each side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is not located radially above the first leading bore 40A and is located entirely above the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is entirely overlapped (or located below) the pocket 34.

Figure 21:
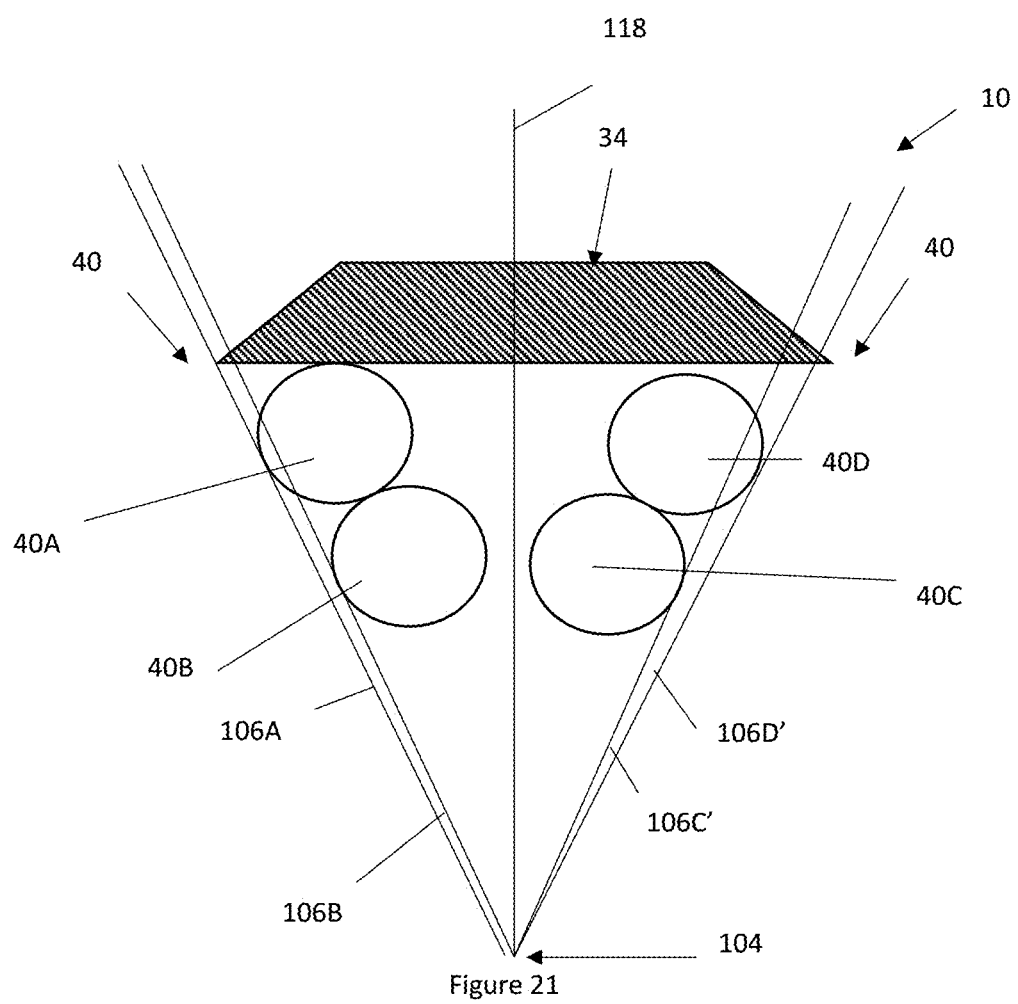
FIG. 21 illustrates a pocket entirely radially extending over four bores.

FIG. 21 illustrates the relationship of the bores 40 relative to the pocket 34. The pocket 34 as shown is substantially evenly distributed on each side of the bisecting line 118, which extends upward from a center 104 of a rotor (not shown). The first leading bore 40A has a first radial direction leading line 106A and the second leading bore 40B has a second radial direction leading line 106B that demonstrates that the pocket 34 is located entirely radially above the first leading bore 40A and is located entirely above the second leading bore 40B. The first trailing bore 40C has a first radial direction trailing line 106C' that illustrates that the first trailing bore 40C is located entirely radially under the pocket 34. The second trailing bore 40D has a second radial direction trailing line 106D' that illustrates that the second trialing bore 40D is entirely overlapped by (or located below) the pocket 34.

Figure 22:
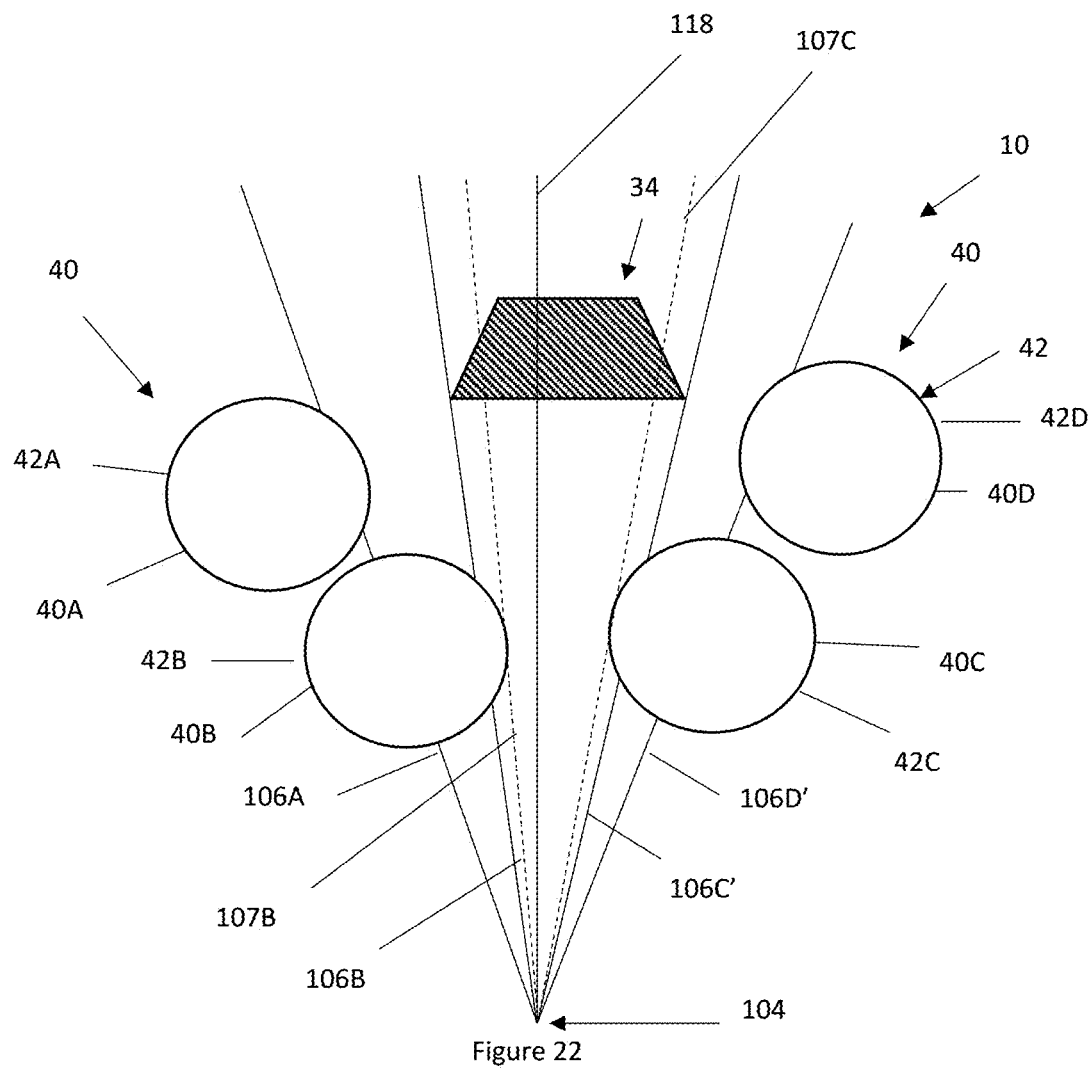
FIG. 22 illustrates a relationship of the pocket relative to the bores and the boot grooves.

FIG. 22 illustrates the relationship of the bores 40 and boot grooves 42 relative to the pocket 34. Boot grooves 42, although not shown, can be added to any of FIGS. 13 through 21. The pocket 34 as shown is offset to the trailing side 10 of the bisecting line 118, which extends upward from a center 104 of a rotor (not shown). A radially outward line is shown from the center 104 and into contact with a wall of each of the bores 40 and two of the boot grooves 42. The first leading bore 40A has a first radial direction leading line 106A that forms an angle with the bisecting line 118, and the second leading bore 40B has a second radial direction leading line 106B that forms an angle with the bisecting line 118 and demonstrates that the pocket 34 is not located radially above the first leading bore 40A or the second leading bore 40B. The first leading boot groove 42A is not radially located below the pocket 34, and the second leading boot groove 42B is located partially below the pocket 34 as is indicated by the second boot groove radial direction line 107B. The first trailing bore 40C has a first radial direction trailing line 106C' that forms an angle with the bisecting line 118 and illustrates that the first trailing bore 40C is not located radially under the pocket 34, but the second trailing boot groove 42C is partially located radially under the pocket 34 as is indicated by the first boot groove radial direction line 107C. The second trailing bore 40D has a second radial direction trailing line 106D' that forms an angle with the bisecting line 118 and illustrates that the second trialing bore 40D and second boot groove 42D is not overlapped (or located below) the pocket 34.

Figure 23:
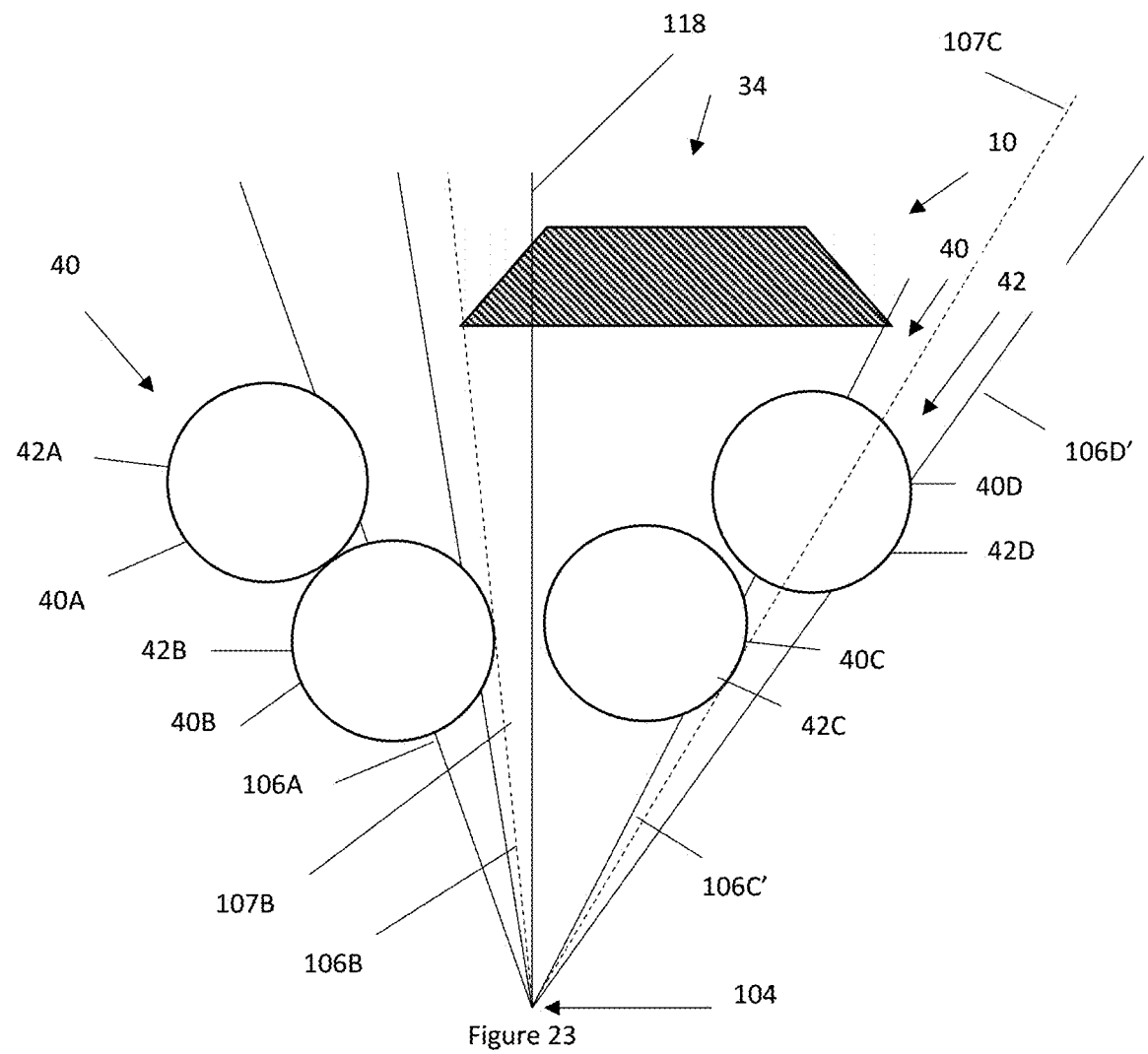
FIG. 23 illustrates a pocket entirely radially extending over one bore, partially radially extending over one bore, and partially radially extending over two boot grooves.

FIG. 23 illustrates the relationship of the bores 40 and boot grooves 42 relative to the pocket 34. The pocket 34 as shown is offset to the trailing side 10 of the bisecting line 118, which extends upward from a center 104 of a rotor (not shown). A radially outward line is shown from the center 104 and into contact with a wall of each of the bores 40 and two of the boot grooves 42. The first leading bore 40A has a first radial direction leading line 106A that forms an angle with the bisecting line 118, and the second leading bore 40B has a second radial direction leading line 106B that forms an angle with the bisecting line 118 and demonstrates that the pocket 34 is not located radially above the first leading bore 40A or the second leading bore 40B. The first leading boot groove 42A is not radially located below the pocket 34, and the second leading boot groove 42B is not located below the pocket 34 as is indicated by the second boot groove radial direction line 107B. The first trailing bore 40C has a first radial direction trailing line 106C' that forms an angle with the bisecting line 118 and illustrates that the first trailing bore 40C is entirely located radially under the pocket 34, but the second trailing boot groove 42C is partially located radially under the pocket 34 as is indicated by the first boot groove radial direction line 107C extending beyond the first boot groove radial direction line 107C. The second trailing bore 40D has a second radial direction trailing line 106D' that forms an angle with the bisecting line 118 and illustrates that the second trialing bore 40D and second boot groove 42D are partially overlapped (or located below) by the pocket 34.

Figure 24:
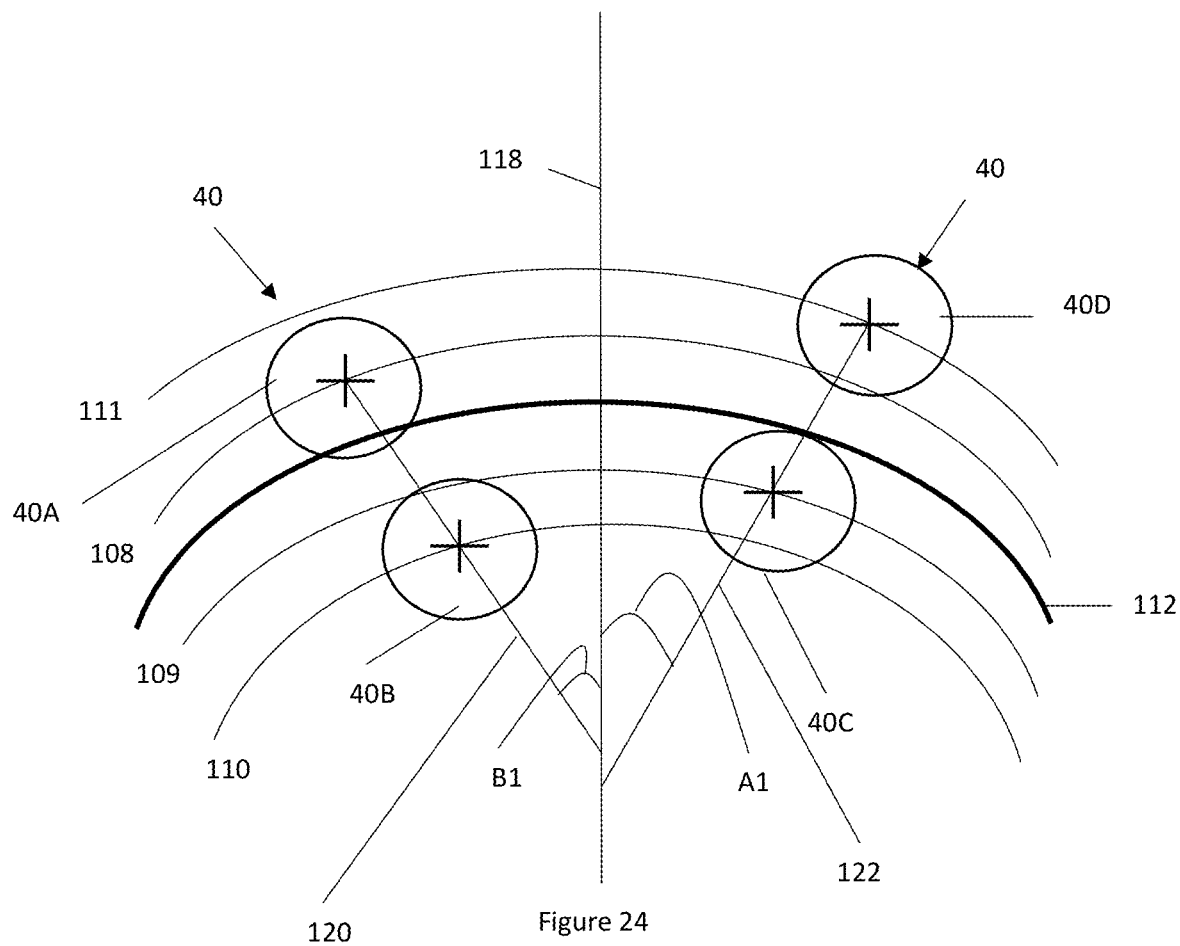
FIG. 24 illustrates rotor tracks.

FIG. 24 illustrates multiple rotor tracks that are created by the stagger of the bores 40. A first piston track 108 extends through a center of the first leading bore 40A. A second piston track 110 extends through a center of the second leading bore 40B and is spaced apart from the first piston track 108. A third piston track 109 extends through the first trailing bore 40C and the third piston track 109, as shown, is located between the first piston track 108 and the second piston track 110. A fourth piston track 111 extends through the second trailing piston 40D and the fourth piston track 111, as show, is located above the first piston track 108. The rotor has an effective braking radius 112 that extends between the four piston tracks. A bisecting line 118 extends between the bores so that a leading side and a trailing side are formed. The leading side includes a first leading bore 40A and a second leading bore 40B that extend at an angle (B1) as shown by a leading bore line 120 that extends through a center of each bore to the bisecting line 118. The trailing side includes a first trailing bore 40C and a second trailing bore 40D that extend at an angle (A1) as shown by a trailing line 122 that extends through a center of each bore to the bisecting line 118.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:
1. A caliper comprising:
 a. an inboard side including three or more bores, wherein one or more of the three or more bores is radially staggered relative to two or more of the three or more bores;
 b. an outboard side including three or more bores, wherein one or more of the thee or more bores on the outboard side is radially staggered relative to two or more of the three or more bores on the outboard side; and
 c. a pocket located within a central region of the inboard side, the outboard side, or both;
 d. a bisecting line that extends through the pocket;
 wherein the three or more bores on the inboard side, the outboard side, or both are positioned so that:
  i. all of the three or more bores are located entirely radially below the pocket;
  ii. none of the three or more bores are located entirely or partially radially below the pocket;
  iii. one or more of the three or more bores are located partially radially below the pocket;
  iv. one or more of the three or more bores are located entirely radially below the pocket;
  v. one or more of the three or more bores are not located partially or entirely radially below the pocket; or
  vi. a combination of (iii) through (v), and
 wherein the pocket is a single pocket, and all of the three or more bores on the inboard side, the outboard side, or both are located entirely circumferentially spaced from the bisecting line, and the pocket is asymmetrically located between the three or more bores on the inboard side, the outboard side, or both.

2. The caliper of claim 1, wherein the caliper includes a leading region that is located on a first side of the bisecting line, and a trailing region that is located on a second side of the bisecting line and one or more of the three or more bores on the inboard side, the outboard side, or both are located entirely in the leading region, entirely in the trailing region, or both.

3. The caliper of claim 1, wherein the caliper includes a leading region that is located on a first side of the bisecting line, and a trailing region that is located on a second side of the bisecting line, and the bisecting line extends through one or more of the three or more bores on the inboard side, the outboard side, or both.

4. The caliper of claim 2, wherein the one or more bores located in the leading region, the trailing region, or both are partially or entirely located radially below the pocket.

5. The caliper of claim 4, wherein the one or more bores located in the leading region are partially or entirely located below the pocket and the one or more bores located in the trailing region are entirely located radially outside of a location below the pocket.

6. The caliper of claim 4, wherein the one or more bores located in the trailing region are partially or entirely located below the pocket and the one or more bores located in the leading region are entirely located radially outside of a location below the pocket.

7. The caliper of claim 1, wherein the three or more bores on the inboard side and the three or more bores on the outboard side are each four or more bores.

8. The caliper of claim 7, wherein two of the four or more bores are located in the leading region and two of the four or more bores are located in the trailing region, and the two or more bores in the trailing region and the two or more bores in the leading region are asymmetrically located relative to the bisecting line.

9. The caliper of claim 1, wherein the pocket on the outboard side is a through hole and the pocket on the inboard side is a depression.

10. The caliper of claim 1, wherein the pocket on the outboard side and the inboard side are flares that are connected to one or more windows that extend from the inboard side to the outboard side.

11. The caliper of claim 1, wherein at least two of the three or more bores are located in a leading region of the caliper, and at least two of the three or more bores are located in a trailing region of the caliper, and the two or more bores in the trailing region are located a greater distance from the bisecting line than the two or more bores in the leading region.

12. A caliper comprising:
 a. an inboard side including three or more bores, wherein one or more of three or more bores is radially staggered, and partially or entirely radially stacked relative to one or more of the three or more bores; and
 b. an outboard side including three or more bores on the outboard side, wherein one or more of the three of more bores on the outboard side is radially staggered and partially or entirely radially stacked relative to one or more of the three or more bores on the outboard side; and
 wherein the inboard side and the outboard side include:
  i. a top;
  ii. a bottom,
  iii. a trailing side connecting the inboard side and the outboard side, and
  iv. a leading side connecting the inboard side and the outboard side;
 wherein the one or more bores that are radially staggered and partially or entirely stacked on the inboard side, the outboard side, or both are located proximate to the top and one or more bores are located proximate to the bottom, and the one or more bores located proximate to the top have a larger diameter than the one or more bores located proximate to the bottom.

13. The caliper of claim 12, wherein the three or more bores on the inboard side, the outboard side, or both are four bores and the one or more bores that are radially staggered and partially or entirely stacked are located proximate to the top and two bores are located proximate to the bottom.

14. The caliper of claim 13, wherein two bores are located proximate to the top and two bores are located proximate to the bottom.

15. The caliper of claim 12, wherein the inboard side, the outboard side, or both include four bores and a bore located towards the trailing side and at the top is the largest bore of the four bores.

16. The caliper of claim 12, wherein a bisecting line bisects the caliper so that a leading region is on a first side of the bisecting line and a trailing region is located on a second side of the bisecting line, and one or more bores of the three or more bores are located in the leading region and one or more bores of the three or more bores are located in the trailing region; wherein the one or more bores of the three or more bores located in the trailing region are located a greater distance from the bisecting line than the one or more bores of the three or more bores in the leading region.

17. The caliper of claim 16, wherein the leading region includes two or more of the three or more bores, and the trailing region includes two or more of the three or more bores.

* * * * *